US006225788B1

(12) United States Patent
Kouzu et al.

(10) Patent No.: US 6,225,788 B1
(45) Date of Patent: May 1, 2001

(54) BATTERY POWER SOURCE DEVICE

(75) Inventors: Katsumi Kouzu, Sanda; Tadao Kimura, Kobe; Toshiaki Nakanishi, Toyohashi; Shuuhei Marukawa, Toyohashi; Kiwamu Inui, Toyohashi; Koh Watanabe, Toyohashi; Kunio Kanamaru, Okazaki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/649,772

(22) Filed: Aug. 29, 2000

Related U.S. Application Data

(63) Continuation of application No. 09/319,328, filed on Sep. 30, 1999.

(30) Foreign Application Priority Data

Oct. 6, 1997 (JP) ...................................... 9-272380

(51) Int. Cl.⁷ .................................................... H01M 10/46

(52) U.S. Cl. ............................................................ 320/150

(58) Field of Search ..................................... 320/112, 116, 320/150, 153, 132

(56) References Cited

U.S. PATENT DOCUMENTS

| 5,546,862 | * | 8/1996 | Schabdach . |
| 5,686,884 | * | 11/1997 | Larkin et al. . |
| 5,795,182 | * | 8/1998 | Jacob . |

FOREIGN PATENT DOCUMENTS

| 8-43508 | * | 2/1996 | (JP) . |
| 8-163786 | * | 6/1996 | (JP) . |
| 9-259940 | * | 10/1997 | (JP) . |

* cited by examiner

Primary Examiner—Edward H. Tso
(74) Attorney, Agent, or Firm—Jordan and Hamburg LLP

(57) ABSTRACT

A power source has a battery pack housing a plurality of interconnected battery modules wherein a plurality of single cells are connected serially. A blower is provided which forces air through the battery pack to maintain the battery modules at a correct temperature. A controller controls the blower in accordance with data provided by sensors which detect voltage, current and temperature. The controller outputs the data and a state of charge. A charging/discharging current circuit includes a relay for interrupting charging and discharging of the battery modules in the event of failure and also includes a rush current prevention resistor and a current sensor. The controller permits the power source to be maintained in a correct operating condition wherein neither overcharging nor undercharging occurs.

17 Claims, 19 Drawing Sheets

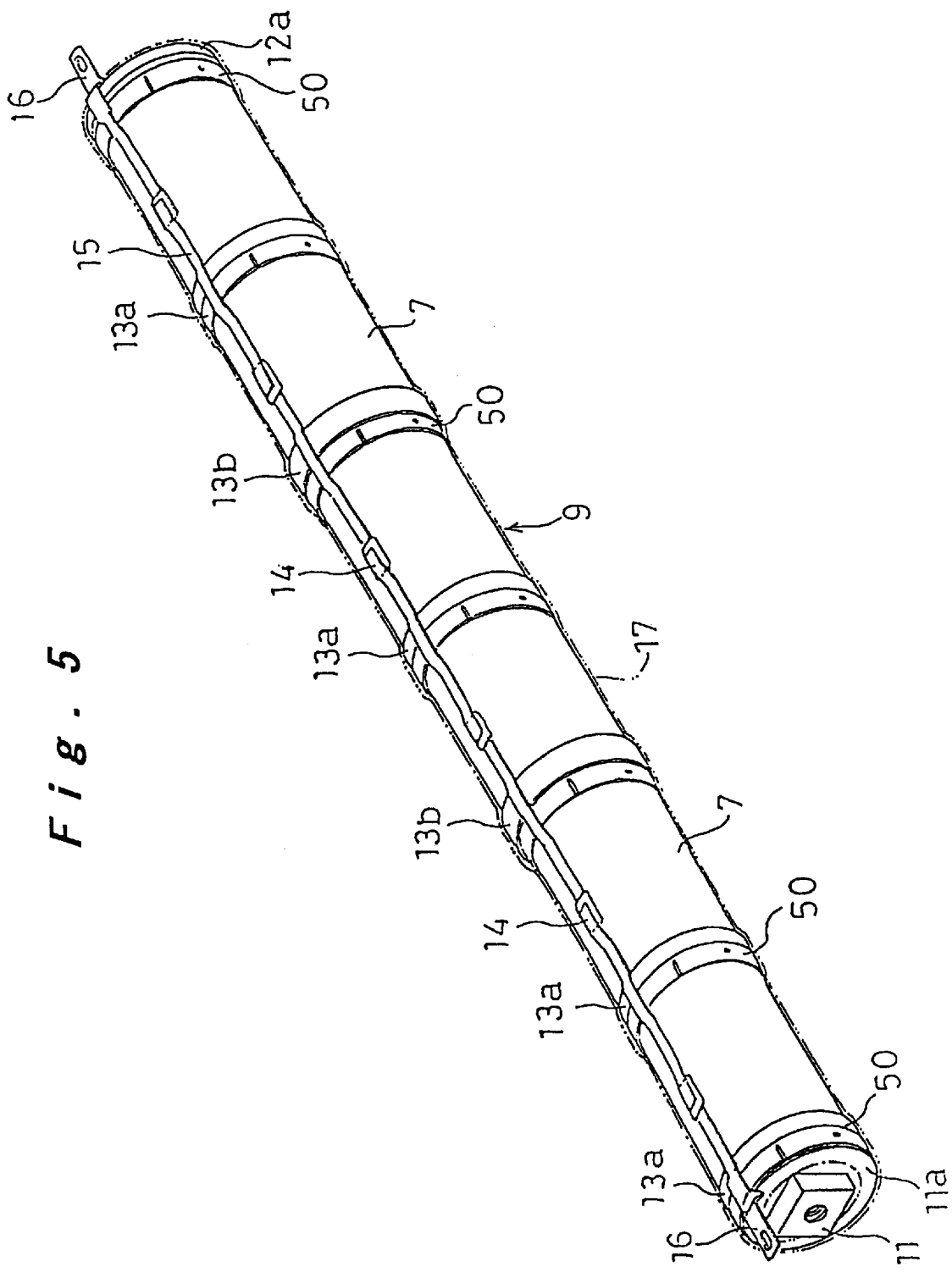

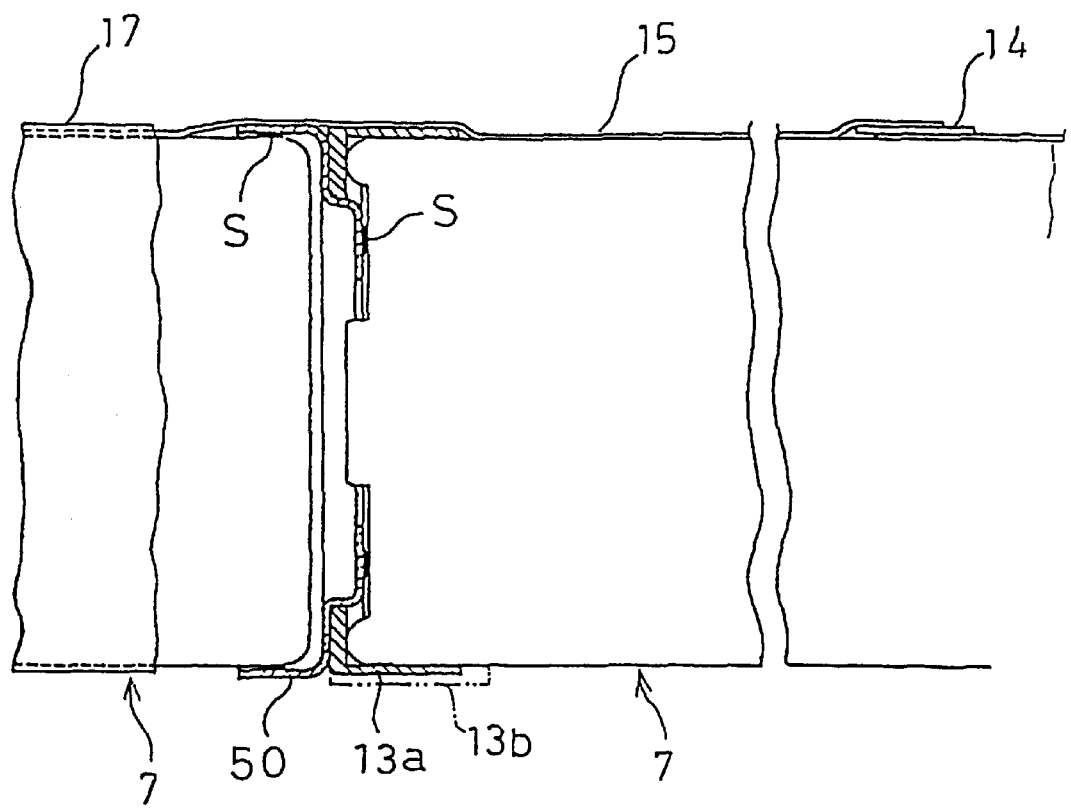

BATTERY ECU

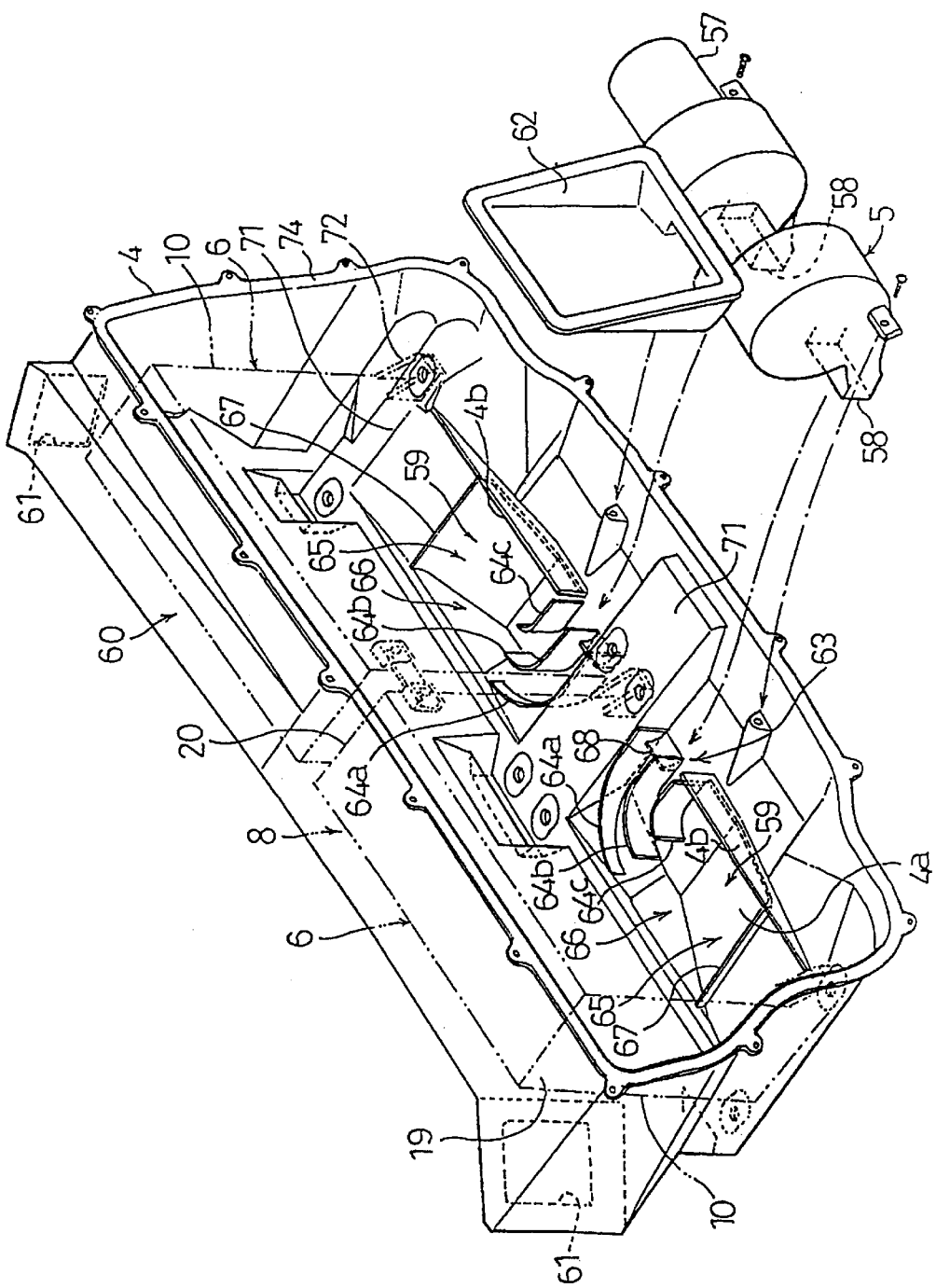

BATTERY POWER SOURCE DEVICE

This application is a continuation of U.S. patent application 09/319,328 filed Sep. 30, 1999 is still pending.

TECHNICAL FIELD

The present invention relates to a battery power source device providing, on a battery pack including an assembly of single batteries, means for controlling this battery pack to maintain an appropriate operating condition.

BACKGROUND ART

Battery power source devices of this type are known in which a plurality of single batteries including secondary batteries are electrically and mechanically connected in series to constitute battery modules, a required output voltage being obtained by series connection of a prescribed number of such battery modules accommodated in a holder case, these being capable of being freely charged or discharged.

However, since a battery power source device constructed as described above is exposed to severe conditions of use when carried in an electric automobile or hybrid vehicle, maintaining it in a suitable operating condition by controlling the temperature and/or charging/discharging of the battery etc. is demanded. In order to meet this demand, it is necessary to know the condition of the battery power source device itself by detecting the temperature and/or voltage etc. of the battery power source and to report to the external device that uses the battery power source data indicating the operating condition of the battery power source, such as the detected temperature, voltage, current and SOC (State Of Charge), which indicates the amount of electricity stored relative to the battery capacity at 25° C.

SUMMARY OF THE INVENTION

An object of the present invention is to provide a battery power source device comprising sensors for detecting the operating condition of the battery, means for control in the event of failure, and means for reporting the operating condition to the outside etc.

In order to achieve, the above object, the present invention according to a first aspect thereof provides a battery power source device comprising: a battery pack wherein battery modules are formed by connecting in series electrically and mechanically a plurality of single cells constituting secondary cells, a plurality of battery modules being held in a holder case in a three-dimensionally parallel arrangement and a plurality of battery modules being electrically connected in series; cooling means whereby coolant is forcibly made to flow within this battery pack; and means for detecting temperature that detect the temperature of a single or a plurality of battery module units.

The characteristic of a battery depends on its temperature and, in particular in the case of a module in which a large number of batteries are collected, rise in temperature can easily occur, making the operating condition of a battery power source unstable. However, with this construction, temperature detection can be achieved by the means for temperature detection at single or a plurality of battery module units, so temperature management can be performed for single or a plurality of battery module units, making it possible to control charging/discharging and/or the cooling means such that each battery module has a uniform temperature, thereby making it possible to maintain the temperature in the battery pack to a correct level.

The cooling means in the above construction is constituted such as to cause coolant to flow in a direction orthogonal to a longitudinal direction of the battery modules, and the means for temperature detection detect the temperature of battery modules on an upstream side and a downstream side of the coolant flow, and can be arranged to calculate the temperature of the battery modules in an intermediate flow region from the detected temperatures of the battery modules on the upstream side and downstream side, in accordance with a temperature distribution trend within the battery pack. Thus the temperature of the battery modules in the intermediate flow region can be calculated by looking up the detected temperatures of the battery modules on the upstream side and downstream side of the coolant flow on the temperature distribution trend, thereby making it possible to detect the temperature at the battery modules in the intermediate flow region without providing temperature sensors there. Consequently, temperature detection of the battery module units becomes possible even though the number of means for temperature detection that are provided is small.

Also, by arranging the cooling means such as to cause coolant to flow in a direction orthogonal to the longitudinal direction of the battery modules, with the means for temperature detection detecting the temperature of a single battery module arranged in parallel in the direction orthogonal with the direction of coolant flow, it can be arranged that the temperature of the other battery modules that are arranged in parallel is calculated in accordance with the temperature distribution trend within the battery pack, and, by finding the temperature distribution trend in the direction orthogonal to the direction of coolant flow beforehand, it is possible to calculate, from the temperature distribution trend, the temperature of the other battery modules in positions that are parallel therewith, by detecting the temperature of a single battery module arranged in parallel therewith in the direction orthogonal to the direction of coolant flow.

Also, by providing a construction such that the cooling means cause coolant to flow in the direction orthogonal to the longitudinal direction of the battery modules and that the means for temperature detection calculate the temperature of other battery modules in accordance with the temperature distribution trend within the battery pack by detecting the temperature of a single battery module; the temperature of the other battery modules can be calculated from temperature detection of a single battery module, by finding the temperature distribution trend at the battery module units within the battery pack.

The temperature distribution trend within the battery pack can be found from the flow rate ant temperature of the coolant and data of the charging/discharging mean power; since the temperature distribution trend within the battery pack in which the cooling structure is formed in a fixed condition can be acquired as data corresponding to changes in factors that produce temperature change, the temperature at points other than the reference point can be calculated from the temperature distribution trend by detecting the temperature at a reference point by a sensor.

Also, the means for temperature detection may include a temperature sensor that detects the temperature at a single or a plurality of battery module units; although detection accuracy is raised if temperature sensors are provided for each battery module, taking into consideration costs and the space for their arrangement etc., it is possible to calculate the temperature of battery modules where temperature sensors are not arranged by providing temperature sensors at chief locations, from the previously known temperature distribution trend, using these as reference.

Also, by controlling the operation of the cooling means in accordance with the detection temperature obtained by the means for temperature detection, the temperature within the battery pack can be controlled to an appropriate condition by adjustment of the flow rate and/or flow speed of coolant.

The present invention according to a second aspect thereof provides a battery power source device comprising: a battery pack wherein battery modules are formed by connecting in series electrically and mechanically a plurality of single cells constituting secondary cells, a plurality of battery modules being held in a holder case in a three-dimensionally parallel arrangement and a plurality of battery modules being electrically connected in series; cooling means whereby coolant is forcibly made to flow within this battery pack; means for voltage detection that detect voltage at a plurality of positions arranged on said battery pack; and means for current detection that detect a charging/discharging current of the battery pack.

With this construction, the charging/discharging power of the battery pack can be calculated from the voltage and current detected by the individual means for detection and the charging/discharging power can be calculated even for battery module units from the voltage at a plurality of locations of the series-connected battery modules.

The means for voltage detection in the above construction may include means that detect a total voltage of the battery pack, enabling the charging/discharging power of the battery pack to be obtained in combination with detection of the charging/discharging current.

Also, the means for voltage detection may include means for detecting voltage at a single or a plurality of battery module units; thus the operating condition is detected from the charging/discharging power of a single or a plurality of battery module units in combination with detection of charging/discharging current, and it becomes easy to specify a battery module in which failure occurred, if failure occurs.

The present invention according to a third aspect thereof provides a battery power source device comprising: a battery pack wherein battery modules are formed by connecting in series electrically and mechanically a plurality of single cells constituting secondary cells, a plurality of battery modules being held in a holder case in a three-dimensionally parallel arrangement and a plurality of battery modules being electrically connected in series; cooling means whereby coolant is forcibly made to flow within this battery pack; means for voltage detection that detect voltage at a plurality of positions arranged on said battery pack; means for current detection that detect a charging and discharging current of the battery pack; means for temperature detection that detect a temperature of a single or a plurality of battery module units; and means for determining battery capacity that calculate SOC using the voltage, current and temperature detected by the respective means for detection.

With this construction, the operating condition of charging/discharging power etc. of the batteries can be detected from the voltage, current and temperature detected by the individual means for detection and the SOC of the batteries can be calculated from the state of change of the voltage, current and temperature, making it possible to control the SOC into an appropriate range such that there is no over-discharging or over-charging.

The means for determining battery capacity in the above construction may calculate the SOC of a single or a plurality of battery module units from the voltage of a single or a plurality of battery module units detected by the means for voltage detection, the temperature of a single or a plurality of battery module units detected by the means for temperature detection, and the current detected by the means for current detection; thus, the SOC at a single or a plurality of battery module units can be grasped, so detection of operating condition and/or variability thereof or failure at battery module units can be performed.

Also, the means for determining battery capacity can be constituted such as to calculate the SOC of a single or a plurality of battery module units by looking up the voltage, current and temperature detected by the individual means for detection in a voltage/current data table which is previously found corresponding to each battery temperature; thus, by looking up the individual detection values on the voltage/current characteristics for each battery temperature which were previously found, it is possible to learn the change of SOC at a single or a plurality of battery module units with the interval of detection of the respective detection values, and thereby to detect variation over time of the operating condition of the battery pack.

Also, in the means for determining battery capacity, the temperature of a single or a plurality of battery module units is detected by means for temperature detection and the voltage and current are detected at prescribed time intervals by respective means for detecting the voltage and current, the detected values of voltage and current at each time point are plotted on voltage/current characteristic co-ordinates and the group of voltage/current detection values thus obtained is compared with voltage/current data tables previously found corresponding to each battery temperature; the SOC of a single or a plurality of battery module units can thereby be calculated; comparison is thus effected by plotting the detection values in the voltage/current characteristic for each battery temperature that was found beforehand on voltage/current characteristic co-ordinates, and the SOC at the battery module units can thus be found from this approximation.

Also, the means for determining battery capacity may be arranged so as to control the cooling means in accordance with the voltage, current and temperature detected by the respective means for detection and the SOC calculated by the means for determining battery capacity; thus, control to maintain the battery modules at the appropriate temperature can be performed by controlling the operation of the cooling means in accordance with the detection values which constitute the causes of the change of temperature of the battery modules.

The present invention according to a fourth aspect thereof provides a battery power source device comprising: a battery pack wherein battery modules are formed by connecting in series electrically and mechanically a plurality of single cells constituting secondary cells, a plurality of battery modules being held in a holder case in a three-dimensionally parallel arrangement and a plurality of battery modules being electrically connected in series, positive and negative terminals of this battery pack being connected to an external device that uses this battery power source device; and a relay that opens and closes the connection of said battery pack and the external device.

With this construction, due to the provision of a relay in the charging/discharging circuit, the connection of the battery pack with the external device can be interrupted by interrupting the charging/discharging circuit in the event of failure; thus control to respond to failure can be achieved.

The present invention according to a fifth aspect thereof provides a battery power source device comprising: a battery pack wherein battery modules are formed by connecting in series electrically and mechanically a plurality of single cells constituting secondary cells, a plurality of battery modules being held in a holder case in a three-dimensionally parallel arrangement and a plurality of battery modules being electrically connected in series; cooling means whereby coolant is forcibly made to flow within this battery pack; means for voltage detection that detect voltage at a plurality of positions arranged on said battery pack; means for current detection that detect a charging and discharging current of the battery pack; means for temperature detection that detect temperature of a single or a plurality of battery module units; means for determining battery capacity that calculate SOC using the voltage, current and temperature detected by the respective means for detection; and a relay that opens and closes the connection with an external device that uses this battery power source device to which positive and negative terminals of said battery pack are connected.

With this construction, the battery operating condition in the battery pack and battery block unit can be determined by means of the voltage, current and temperature detected by the respective means for detection and the SOC that is calculated from these and, furthermore, failure is dealt with by means of the relay; management of operation of the battery power source device can therefore be performed in a reliable fashion.

In the above construction, by providing means for preventing rush current in the connection circuit of the relay, damage to the constituent elements of the circuit due to excessively large rush current can be prevented.

Also, by providing means for series circuit interruption that effect interruption at at least one location of the series circuit of the series-connected battery modules, during manufacture and/or maintenance and inspection etc. the series circuit can be interrupted, thereby stopping a hot-line condition of a high voltage circuit.

The present invention according to a sixth aspect thereof provides a battery power source device mounted on an automobile equipped with a motor and generator, said motor being used as running drive source, comprising: a battery pack wherein battery modules are formed by connecting in series electrically and mechanically a plurality of single cells constituting secondary cells, a plurality of battery modules being held in a holder case in a three-dimensionally parallel arrangement and a plurality of battery modules being electrically connected in series, positive and negative terminals of this battery pack being connected to an external device that uses this battery power source device; cooling means whereby coolant is forcibly made to flow within this battery pack; means for voltage detection that detect voltage at a plurality of positions arranged on said battery pack; means for current detection that detect charging and discharging current of the battery pack; means for temperature detection that detect temperature at a plurality of positions set in said battery pack; means for determining battery capacity that calculate SOC using the voltage, current and temperature detected by the respective means for detection; means for transmitting battery condition that output operational condition data of the battery pack to a vehicle control means of said automobile; and a relay that opens and closes a connection circuit of said battery pack with the automobile.

With the above construction, battery power can be used with the battery pack maintained in the correct operating condition by controlling operation of the motor and generator by the vehicle control means, by outputting to the vehicle control means operating condition data of the battery pack from the means for transmitting battery condition, this battery power source device being mounted on a vehicle equipped with a motor and generator.

Also, since the connection of the battery power source device is interrupted by the relay when failure is detected from the respective detection data, damage to the battery power source device or vehicle in the event of failure can be prevented.

By arranging the means for transmitting battery condition in the above construction such that a failure of the battery pack detected by the respective means for detection is output to the vehicle control means, the vehicle control means is able to detect a failure of the battery pack and perform control to cope with this.

Also, the relay being arranged to interrupt the connection circuit of the battery pack with the automobile by the vehicle control means in the event of occurrence of failure, the connection with the battery power source device can be interrupted by the vehicle control means on detection of failure and response to this failure can be performed rapidly.

BRIEF DESCRIPTION OF THE DRAWINGS

FIG. 5 is a perspective view of a battery module showing in phantom lines an externally mounted tube;

FIG. 6 is a cross-sectional view with part broken away showing a detail of the battery module;

FIG. 21 is a perspective view showing a cooling construction.

BEST MODE FOR CARRYING OUT THE INVENTION

An embodiment of the present invention, which is provided for an understanding of the present invention, is described below with reference to the appended drawings. The battery power source device of this embodiment is constituted as a battery power source for a hybrid type automobile in which the running drive power is obtained by a combination of an internal combustion engine and a battery-driven motor.

Figure 1:
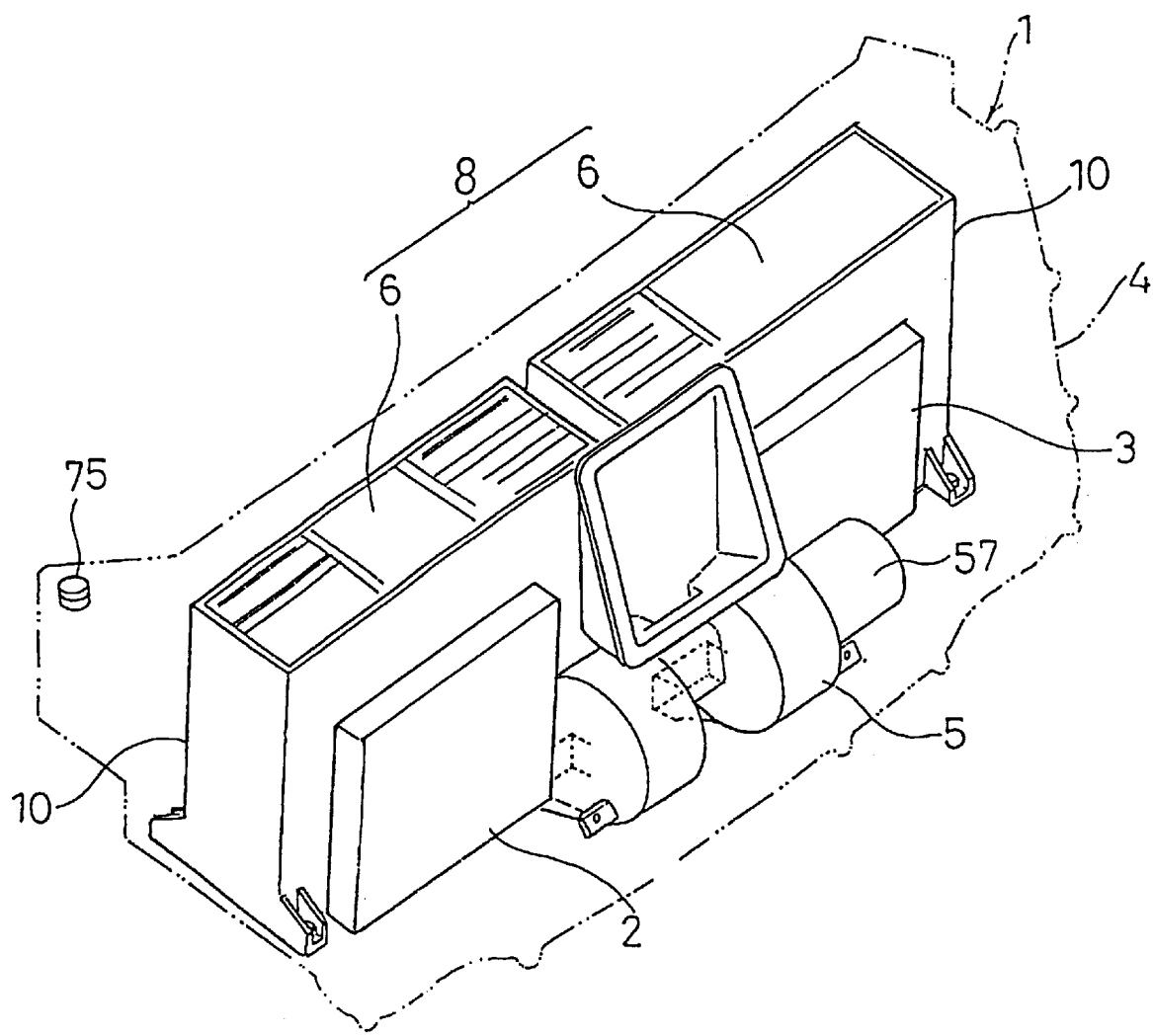
FIG. 1 is a perspective view showing the overall construction of a battery power source device.
Figure 2:
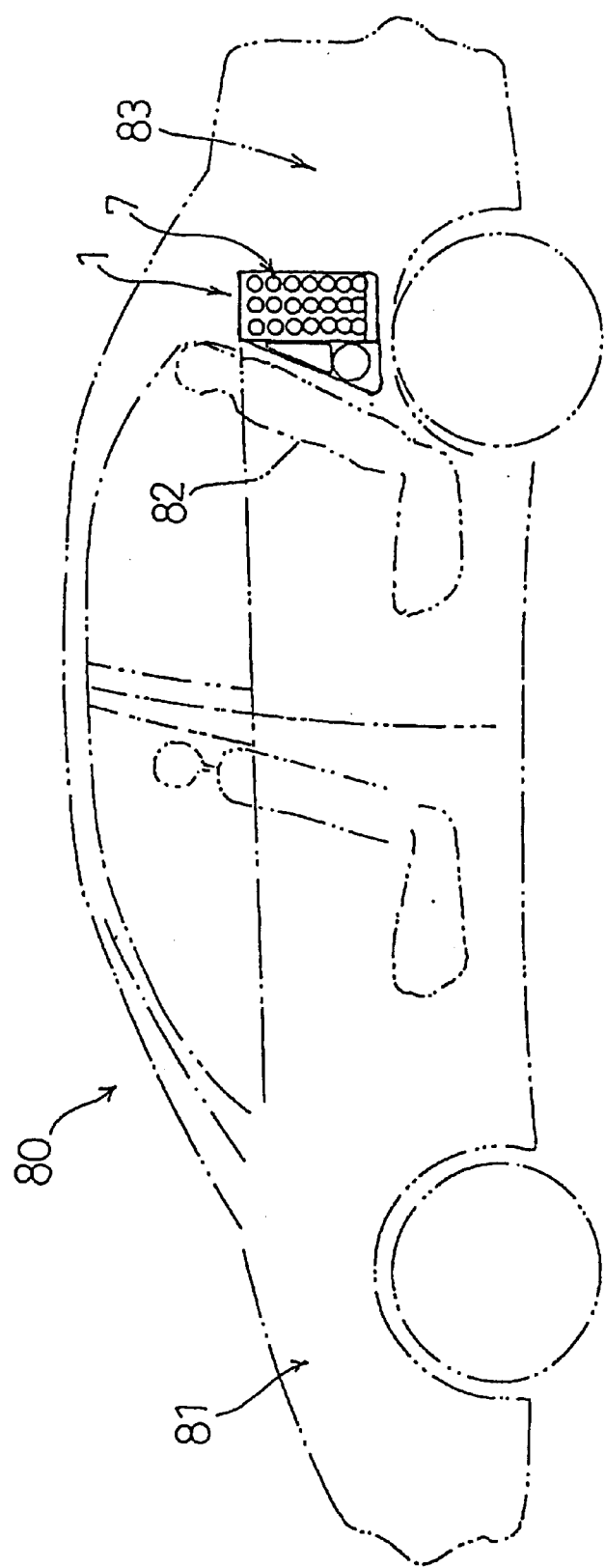
FIG. 2 is a diagrammatic side view showing a condition with the battery power source device mounted on an automobile.

As shown in FIG. 1, battery power source device 1 comprises a battery pack 8 constituted of two battery holders 6, 6 that accommodate a prescribed number of battery modules obtained by connecting a plurality of single cells in series, a blower (cooling means) 5 for cooling the single cells in this battery pack 8, a charging/discharging circuit unit 3 accommodating a relay and a current sensor etc., and a battery ECU (means for determining battery capacity/means for transmitting battery condition) 2 that detects a condition of battery capacity of battery pack 8 and outputs operating condition data; these are accommodated in an outer case 4. As shown in FIG. 2, this battery power source device 1 is arranged in a space provided between a back seat 82 of a hybrid vehicle 80 and a trunk room 83; it outputs drive power to a motor constructed integrally with an engine in engine room 81 and inputs charging power from a generator.

Figure 3:
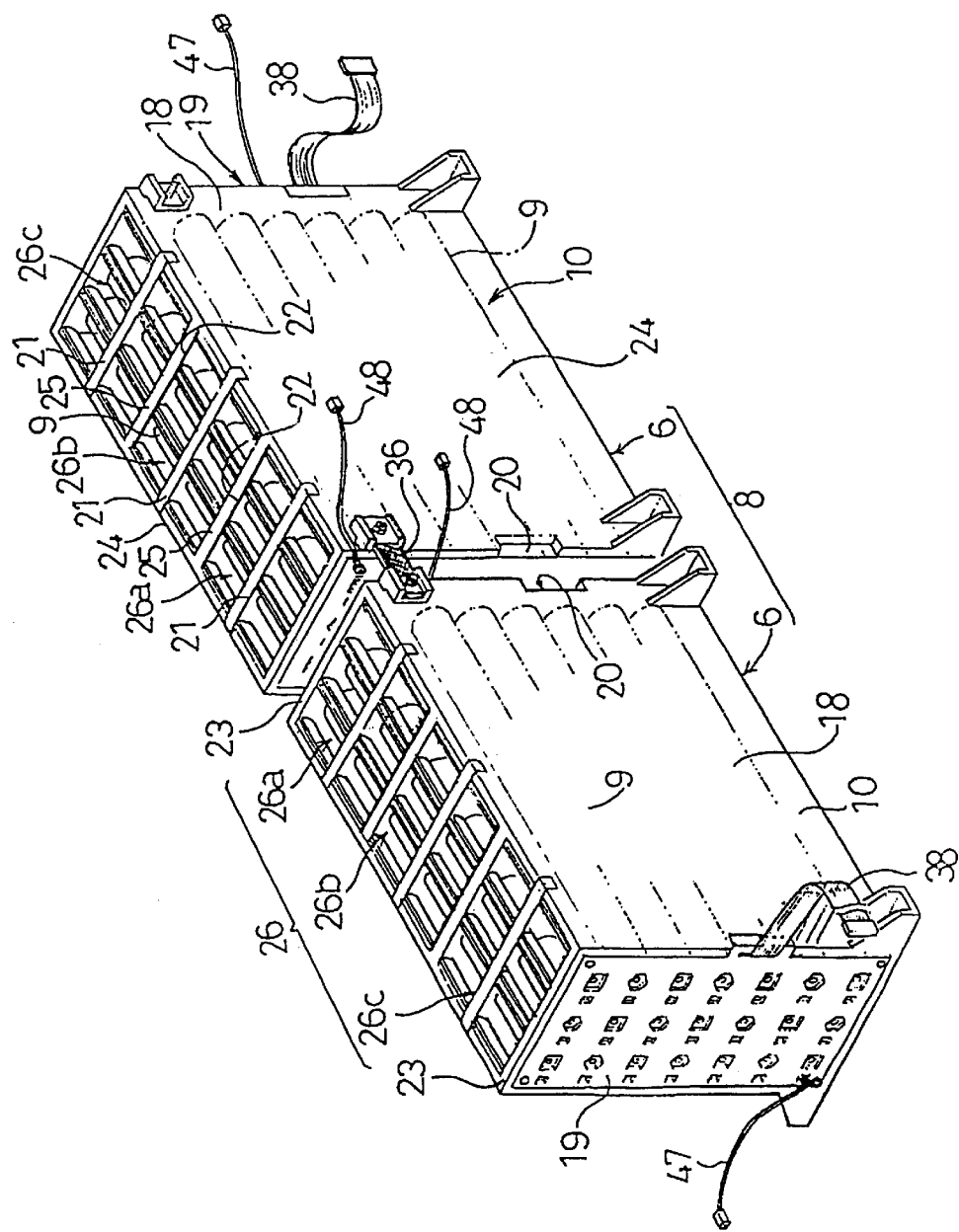
FIG. 3 is a perspective view showing the construction of a battery pack.

As shown in FIG. 3, the battery pack 8 is constituted by battery holders 6, 6 in which respectively twenty battery modules 9, for example, in each case are accommodated in a holder case 10, these modules being constituted by connecting six single cells 7 consisting of nickel metal-hydride secondary cells in series; a battery holder 6 outputs power at a voltage 144V; if two battery holders 6, 6 are connected in series to constitute battery pack 8, this is capable of delivering power at an output voltage of 288V.

Figure 4A:
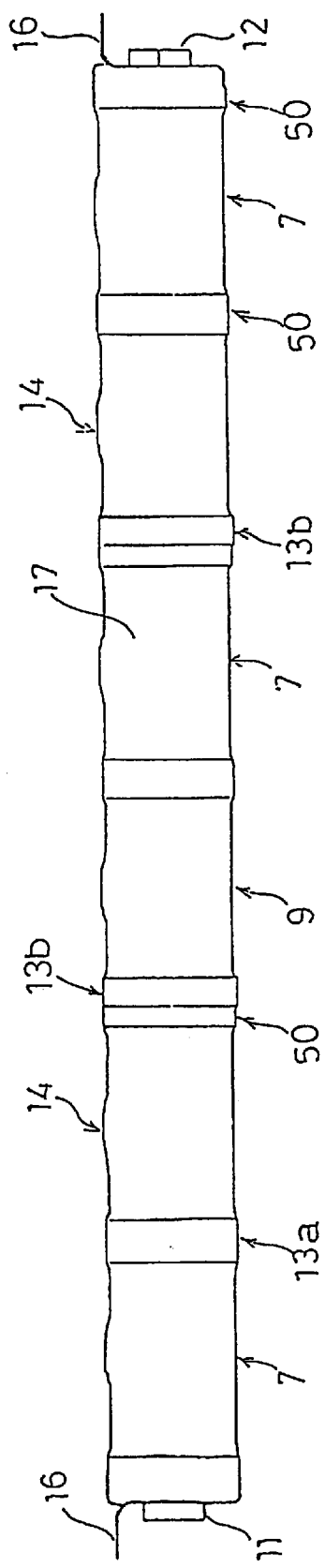
FIG. 4A is a front view showing a battery module.
Figure 4B:
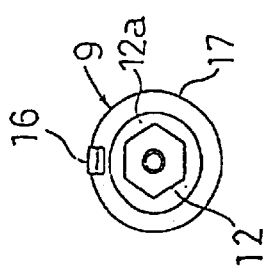
FIG. 4B is a left side view thereof.
Figure 4C:
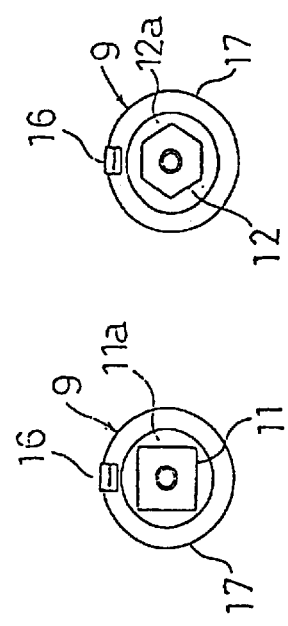
FIG. 4C is a right side view thereof.

As shown in FIG. 4, FIG. 5 and FIG. 6, battery module 9 is formed by series connection of single cells 7 by spot welds S through metallic connecting rings 50. As shown in FIG. 4B, in a plus terminal of this battery module 9, a square nut 11 equipped with a base 11a is spot-welded on to a connecting ring 50 of the plus terminal, mounted on single cell 7. Also, in the case of a minus terminal of the battery module 9, as shown in FIG. 4C, a hexagonal nut 12 equipped with a seat 12a is spot-welded to a connecting ring 50 of a minus terminal, mounted on a single cell 7. The dimension between opposite sides of square nut 11 and the dimension between opposite sides of hexagonal nut 12 are made the same, so that only square holding recess 30a and hexagonal holding recess 30b, to be described, can fit on to nut 11 or 12 of the same shape, thereby preventing the battery polarity from being connected wrongly. Also, resin insulating rings 13a, 13b prevent short-circuiting of the plus terminals and minus terminals of the same cell and are interposed in connection region between single cells 7. These insulating rings 13a, 13b are of two types of different external diameter; of the total of six insulating rings 13a, 13b, the two indicated by 13b have the larger diameter.

Also, at the lateral peripheral surface of single cells 7 constituting battery module 9, there are disposed temperature detection elements, for example abnormal temperature sensors 14 such as poly-switches whose resistance changes abruptly at a prescribed threshold temperature, these being connected in series by connecting wires 15, and mounted such that terminal tabs 16, 16 consisting of flexible metallic sheet project at both ends from battery module 9. Due to the provision of these abnormal temperature sensors 14 on each of the single cells 7, abnormal temperature rise of single cells 7 can be detected.

Furthermore, after being constructed as shown in FIG. 5, the abnormal temperature sensors 14 and their connecting wires 15, together with single cells 7, of battery module 9 are covered by an outer tube 17, made of PVC or the like, having electrical insulating and heat-shrinkage properties. A condition is produced in which square nut 11 constituting the plus terminal, hexagonal nut 12 constituting the minus terminal, and the two terminal tabs 16, 16 are exposed from outer tube 17.

Figure 7:
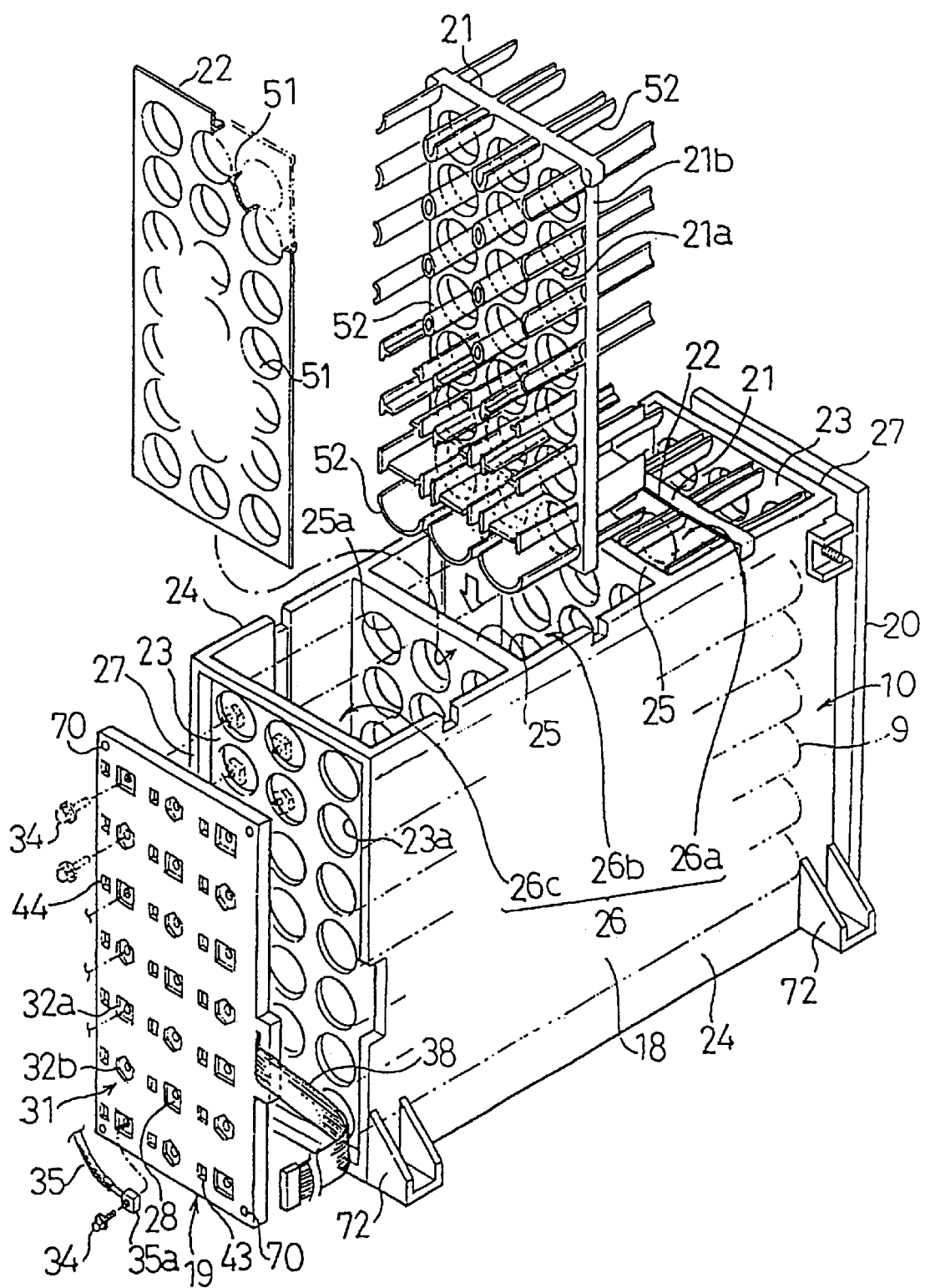
FIG. 7 is an exploded perspective view of a battery holder.
Figure 8:
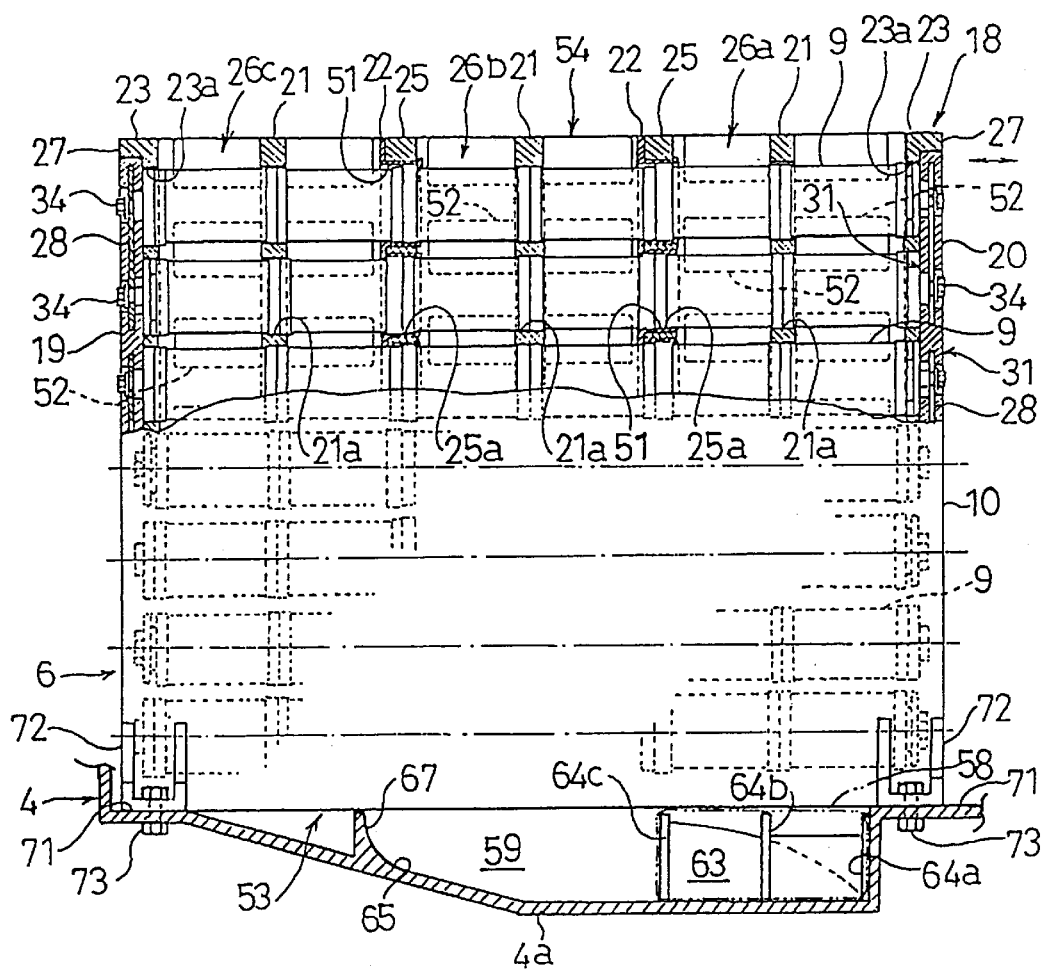
FIG. 8 is a cross-sectional view of the battery holder.
Figure 9:
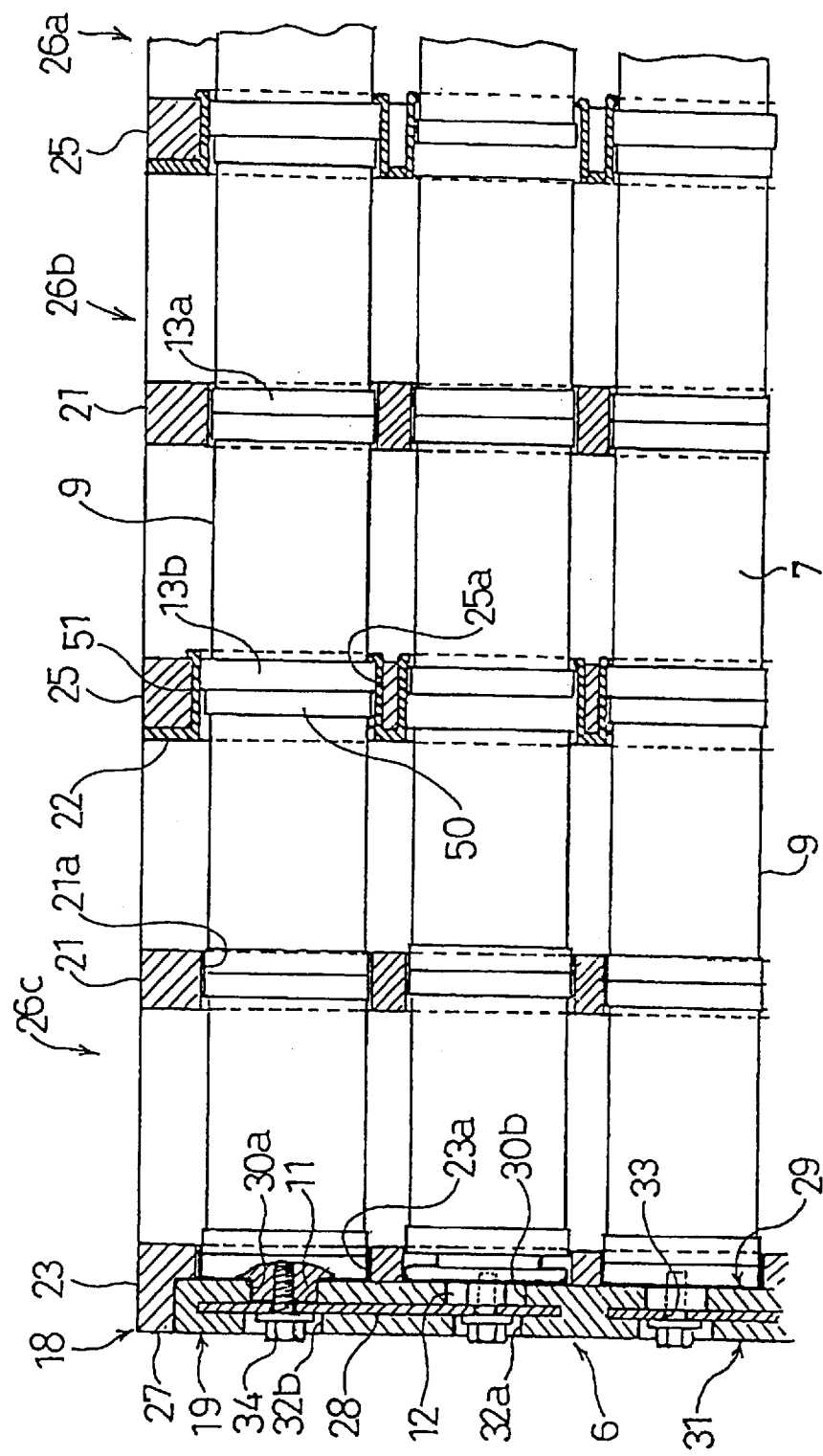
FIG. 9 is a cross-sectional view in a larger scale showing a detail of the battery holder.

As shown in FIG. 3, FIG. 7 and FIG. 8, holder case 10 that accommodates this battery module 9 chiefly comprises case body 18, first end plate 19, second end plate 20, three cooling fin plates 21, 21, 21 and two anti-vibration rubber sheets 22, 22.

Case body 18 is a unitary resin molding formed in the shape of a rectangular prismatic box opened at its upper and lower faces; the space 26 formed within the four perpendicular walls constituted by the two end walls 23, 23 and the two side walls 24, 24 is practically equally partitioned into three spaces 26a, 26b, 26c by two partitions 25, 25 parallel to the two end walls 23, 23. Cooling fin plates 21 are inserted from above respectively into first divided space 26a which is on the side nearest the second end plate 20, second divided space 26b which is in the middle, and third divided space 26c which is on the side nearest the first end plate 19, being positioned in the middle thereof and parallel to both end walls 23, 23; they are then fixed to case body 18.

In end walls 23, 23, partitions 25, 25 and cooling fin plates 21, 21, 21, there are provided a total of twenty-one insertion holes 23a, 25a and 21a in three transverse (horizontal direction) rows and seven vertical (perpendicular direction) rows, for insertion of battery modules 9 in the same corresponding positions; these are formed of diameter larger than the external diameter of battery modules 9.

A first end plate 19 is fixed by being screwed in at one end of case body 18 into end wall 23 using screw holes 70 provided at the four corners thereof. A frame portion 27 is formed at the periphery of end wall 23 of case body 18, within which first end plate 19 is accommodated in fitted-in condition. Furthermore, at the other end of case body 18, a second end plate 20 is removably held on end wall 23. Specifically, the second end plate 20 is held fitted in a condition in which it is movable in frame portion 27 formed in the other end of case body 18.

Figure 10:
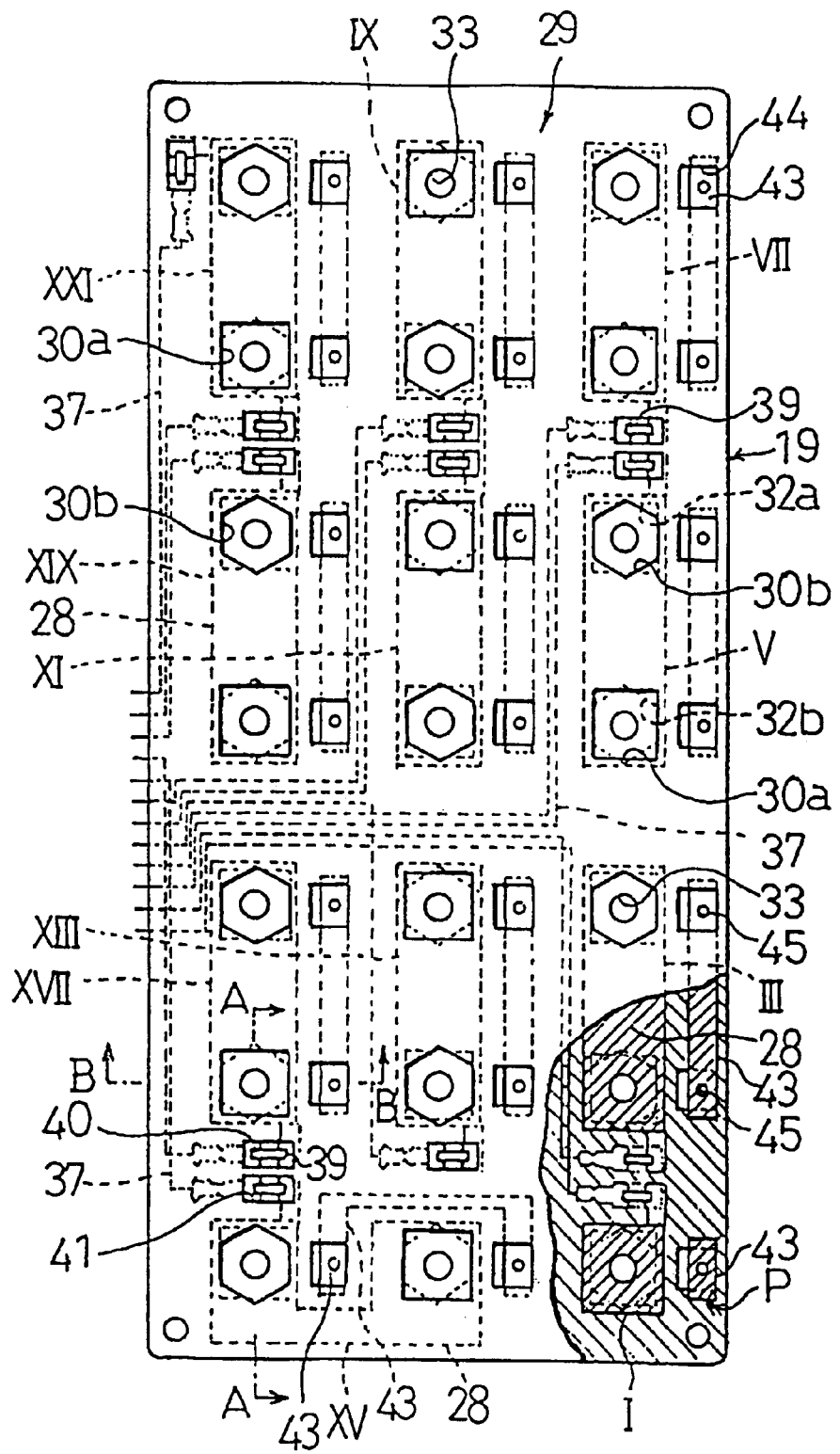
FIG. 10 is a front view seen from the inside face of a first end plate.

As shown in FIG. 7 to FIG. 12, in the case of first end plate 19, pass bars 28 are fixed by embedding in the resin plate by insert molding, and there are provided holding recesses 30a of square shape for fitting in and holding square nuts 11 that constitute the plus terminals of battery modules 9 in the inside face 29 of the resin plate, and holding recesses 30b of hexagonal shape for fitting in and holding hexagonal nuts 12 constituting the minus terminals of battery modules 9. These holding recesses 30a, 30b are arranged in positions corresponding to insertion holes 23a, 25a, 21a, a total of twenty-one being provided overall in three transverse rows and seven vertical rows; as shown in FIG. 10, the two types of holding recesses 30a, 30b are arranged alternately in a relationship with one adjacent recess being a holding recess 30a of square shape on the plus side while the other is a holding recess 30b of hexagonal shape on the minus side.

Since holding recesses 30a, 30b are formed in shapes into which nuts 11, 12 of the terminals of battery module 9 fit, square nuts 11 of the plus terminals are held only in square holding recesses 30a, while hexagonal nuts 12 of the minus terminals are held only in hexagonal holding recesses 30b, so the possibility of their being held with plus and minus the wrong way round is excluded.

On the outside face 31 of first end plate 19, there are formed a total of twenty-one securing recesses 32a, 32b in positions corresponding to holding recesses 30a, 30b, their shape being of two kinds, namely, square and hexagonal; square securing recesses 32a are of the same shape as square holding recesses 30a and hexagonal securing recesses 32b of the same shape as hexagonal holding recesses 30b. Thus, as shown in FIG. 10, hexagonal securing recesses 32b are provided at the rear face of square holding recesses 30a, while square securing recesses 32a are provided at the rear face of hexagonal holding recesses 30b, respectively. The reason for adopting this construction is that it makes it possible to use identical members in common for the respective end plates 19, 19 of the pair of left and right battery holders 6, 6 constituting battery pack 8 shown in FIG. 3. First end plate 19 when used in left-side battery holder 6 is assembled with case body 18 in the condition described above, but, when used in right-side battery holder 6, first end plate 19 is assembled with case body 18 by turning it back to front, so that the recesses corresponding to the aforementioned securing recesses 32a, 32b are now used as holding recesses 30a, 30b.

Metallic pass bars 28 that electrically connect the terminals of battery modules 9 are embedded and fixed by insert molding such as to be positioned in the middle in the thickness direction of first end plates 19, pass bars 28 are exposed to the outside in a portion surrounded by holding recesses 30a and 30b and securing recesses 32a, 32b, through-holes 33 being formed in the middle of this exposed portion. The nuts 11, 12 at both ends of battery modules 9 are threaded on to bolts 34 that are inserted through the through-holes 33 from the side of securing recesses 32a, 32b in a condition in which they are inserted and held in holding recesses 30a, 30b, so that nuts 11, 12 are electrically and mechanically coupled with respective pass bars 28 by tightening bolts 34.

Figure 13:
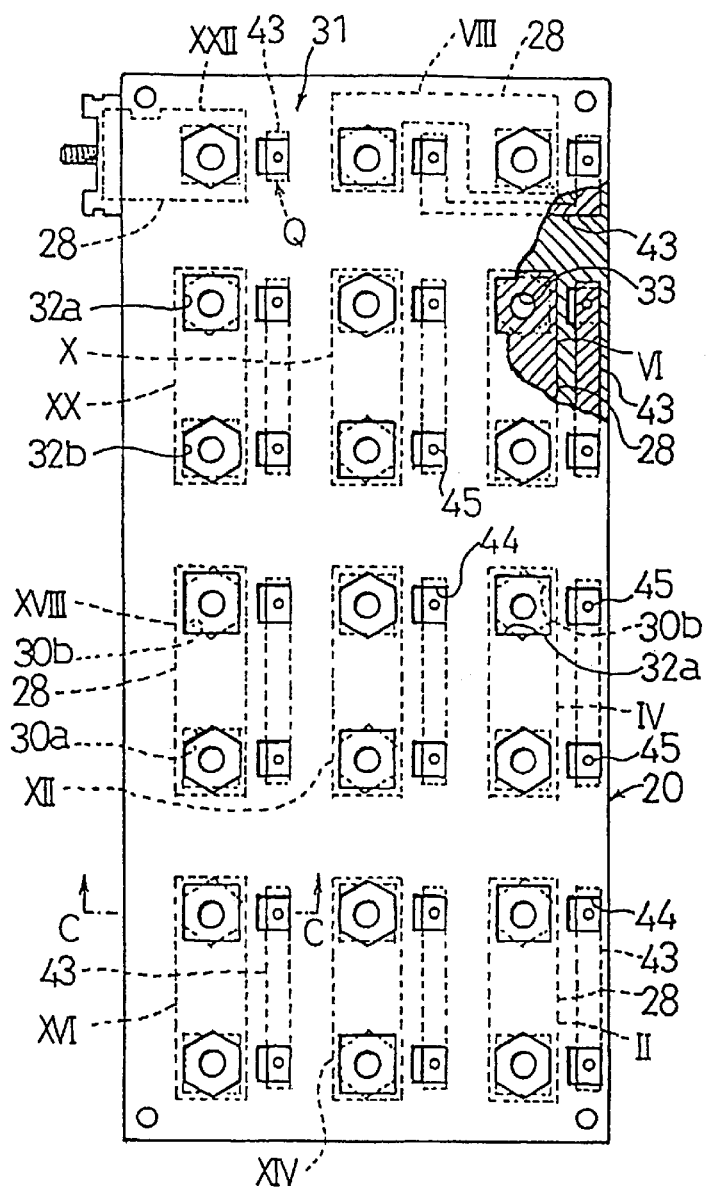
FIG. 13 is a front view seen from the outer face side of a second end plate.
Figure 14:
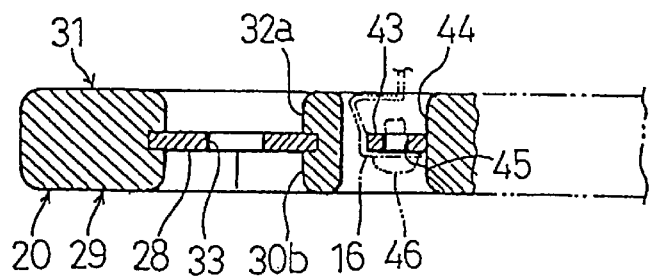
FIG. 14 is a cross-sectional view in a larger scale seen along the line C—C of FIG. 13.

Second end plate 20, as shown in FIG. 8, FIG. 13 and FIG. 14 is constructed of a resin plate in the same way as first end plate 19, and has embedded in the resin plate pass bars 28 by insert molding; it is provided with-holding recesses 30a, 30b at its inside face 29 and with securing recesses 32a, 32b at its outside face 31; nuts 11 and 12 at both ends of each battery module 9 are electrically and mechanically coupled to pass bars 28 by bolts 34 in the same way as in the case of the first end plate 19. Of course, the hexagonal holding recesses 30b of second end plate 20 are arranged in positions facing the square holding-recesses 30a of first end plate 19, and the square holding recesses 30a of second end plate 20 are arranged in positions facing hexagonal holding recesses 30b of first end plate 19.

While twenty-one battery modules 9 can be accommodated in battery holder 6 as described above, in the construction of the present embodiment, since, as described above, the output voltage of battery pack 8 is set at 288V, twenty battery modules 9 are accommodated in a battery holder 6, and the output voltage of battery holder 6 is made 144V, the two left and right battery holders 6, 6 being connected in series to obtain an output voltage of battery pack 8 of 288V. Specifically, since the voltage of a single cell 7 is 1.2V, the voltage across the two terminals of battery module 9 wherein six of these are connected in series is 7.2V, and battery holder 6 gives 7.2V×20 =144V.

Figure 15:
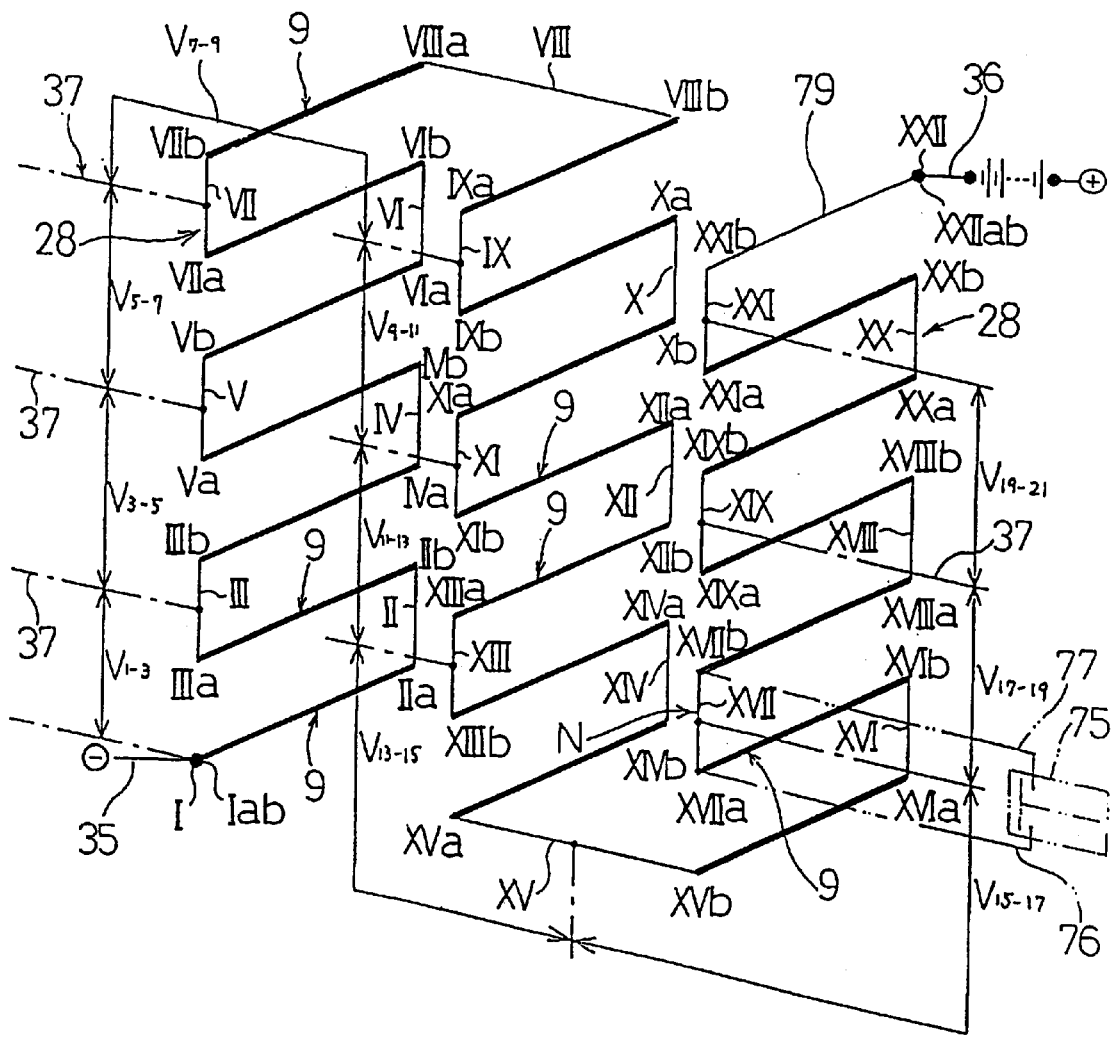
FIG. 15 is a connection diagram showing the connected condition of a battery module.

The twenty battery modules 9 accommodated in a battery holder 6 are electrically connected in series by pass bars 28 arranged in first end plate 19 and pass bars 28 arranged in second end plate 20. The pass bars 28 embedded and fixed in end plate 19 are the eleven pass bars indicated in FIG. 10 by I, III, V, VII, IX, XI, XIII, XV, XVII, XIX, XXI and the pass bars 28 embedded and fixed in second end plate 20 are the eleven pass bars indicated in FIG. 13 by II, IV, VI, VIII, X, XII, XIV, XVI, XVIII, XX, XXII; the connection relationship of these with battery modules 9 is shown in FIG. 15. As described above, since there are twenty battery modules 9, a battery module 9 is not arranged between a pass bar 28 (XXI) of first end plate 19 and pass bar 28 (XXII) of second end plate 20; a short-circuit wire 79 is arranged therebetween instead of battery module 9.

It should be noted that, while, of the pass bars 28 indicated by I and XXII, it would strictly be more appropriate to term the former I the minus terminal bar and the latter XXII the plus terminal bar, although this is not included in the concept of pass bars of the present invention, for convenience in description of the present embodiment, these are termed pass bars, and described below.

The pass bars indicated by II to XXII have contacts with the plus terminal of the battery module 9 and the minus terminal which are adjacent in the electrical series, so that the adjacent battery modules 9 are electrically connected in series. For example, in FIG. 15, the pass bar indicated by II is provided with a plus terminal contact IIa and a minus terminal contact IIb and the pass bar indicated by XXII is provided with a plus terminal contact XXIa and a minus terminal contact XXIb. In FIG. 15, the contact indicated by Iab is the minus terminal of the entire battery pack 8 and a connecting terminal ring 35a (see FIG. 7) of power cable 35 is connected thereto. Also, in FIG. 15, the contact indicated by XXIIab is the plus terminal of one battery holder 6, and the connection terminal of connecting cable 36 (see FIG. 3) that is connected to the minus terminal of the other battery holder 6 is connected thereto. It should be noted that connecting cable 36 is flexible, so that, even when movement of second end plate 20 occurs due to thermal contraction of battery module 9, electrical connection between the two battery holders 6, 6 is still reliably effected.

Figure 16:
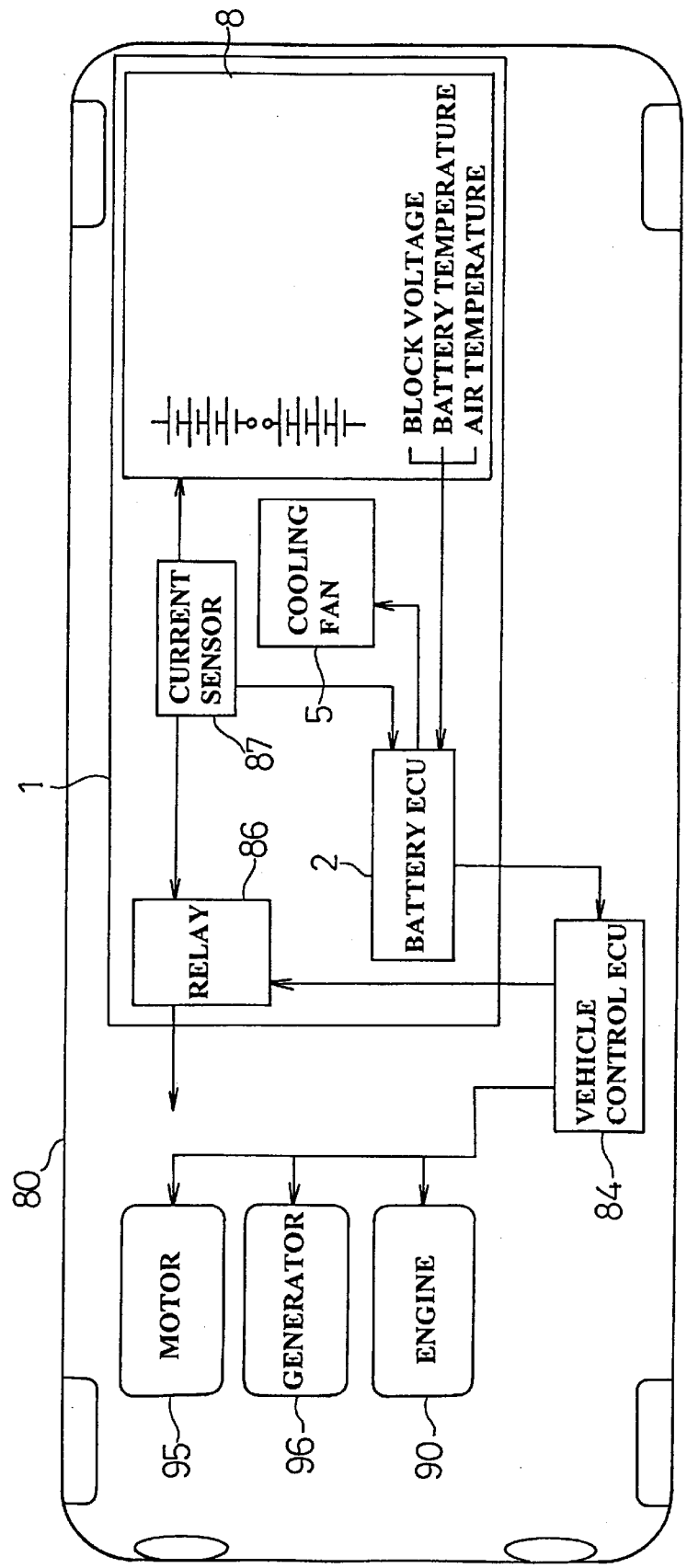
FIG. 16 is a system layout diagram of the condition in which the battery power source device is mounted on a hybrid vehicle.

As described above, battery pack 8 is constituted by battery holders 6, 6 that accommodate respectively twenty battery modules 9; in order to achieve stable operation of this battery pack 8 as a battery power source for hybrid vehicle 80, within an interior of battery power source device 1, there are provided: (A) a system for detecting the operational condition of the batteries, (B) a countermeasures system for dealing with occurrence of failure, (C) a countermeasures system with respect to heat generated by the batteries and (D) a system for outputting to the vehicle data indicating the operating condition of battery pack 8. FIG. 16 shows the system layout of battery power source device 1 incorporated in part of hybrid vehicle 80; the various systems (A) to (D) are described below.

The hybrid vehicle is provided with an engine 90 and motor 95 and generator 96; the rotational power of motor 95 is obtained from battery pack 8 and, by rotating generator 96 by engine 90 and regenerated energy during braking, this power is 29 supplied to the battery pack. This control is executed by the vehicle control ECU (Vehicle Control Device) 84 in accordance with data indicating the operating condition of the battery from battery ECU 2; battery pack 8 is thereby maintained in the correct operating condition.

(A) Detection of the operating condition of the batteries

The operating condition of the batteries, such as a total voltage of battery pack 8, block voltages of the units of the two battery modules 9, charging/discharging current of battery pack 8, temperature of the battery module units, and air temperature (coolant temperature) the air cooling of battery pack 8 are respectively detected, and the detected data are input to battery ECU 2. Battery ECU 2 calculates the SOC, which is the quantity of electricity stored in relation to the battery capacity, from the detected values of voltage, current and temperature. Control is effected to the appropriate condition such that over-discharging or over-charging do not occur, by performing discharging and charging such that the SOC is maintained in the appropriate range.

The total voltage of battery pack 8 is of course the voltage between the plus and minus terminals of battery pack 8 and is the voltage measured between the plus and minus power cables 35, 35 leading from battery holders 6, 6.

Figure 11A:
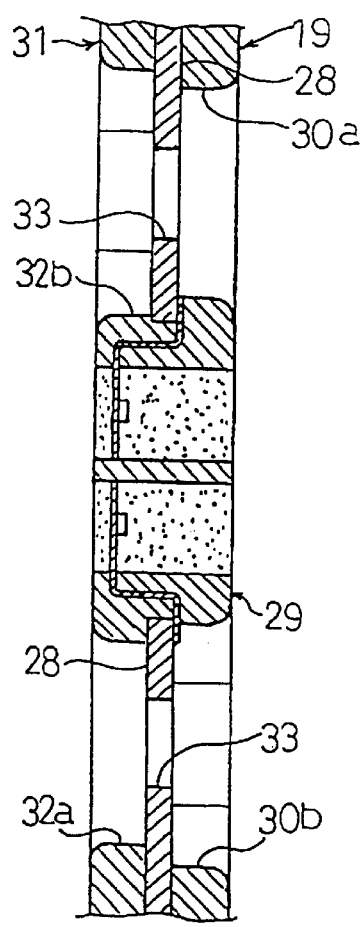
FIG. 11A is a cross-sectional view in a larger scale along the line A—A of FIG. 10
Figure 11B:
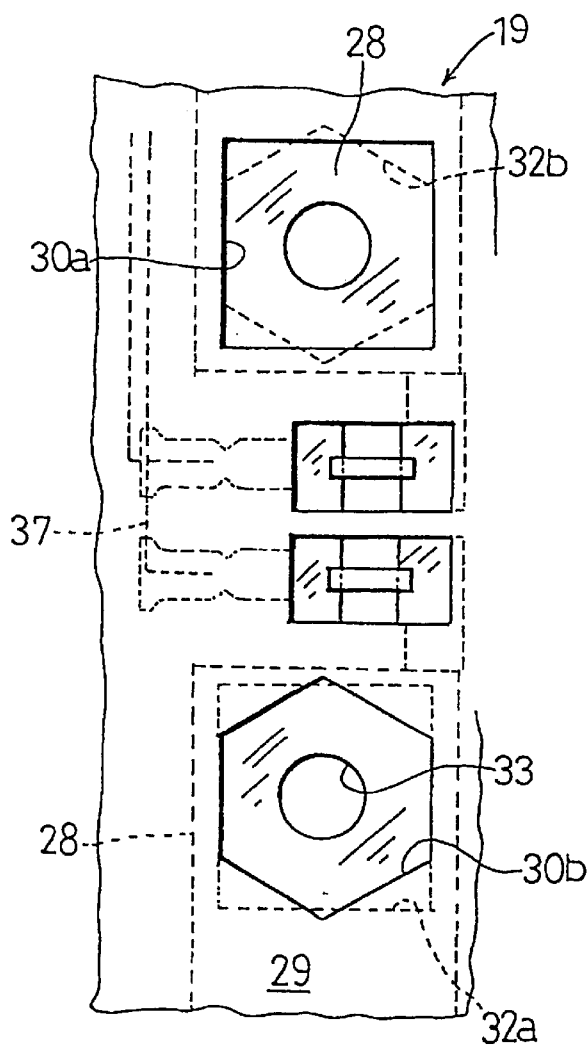
FIG. 11B is a front view thereof.
Figure 12:
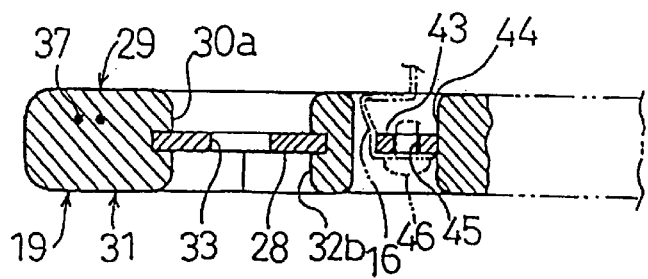
FIG. 12 is a cross-sectional view in a larger scale along the line B—B of FIG. 10.

For the voltage of the battery module 9 units, in this embodiment, it is arranged to measure the voltage between the terminals of each of the two battery modules 9, 9. As shown in FIG. 10, FIG. 11 and FIG. 12, leads 37 for measuring the voltage between the terminals of the two battery module 9, 9 units are embedded in first end plate 19 in the resin plate by insert molding.

As shown by the single-dotted chain lines in FIG. 15, these leads 37 are respectively connected to the pass bars 28 indicated by I, III, V, VII, IX, XI, XIII, XV, XVII, XIX, and XXI; for example the construction is such that the voltage $V_{1-3}$ between the pass bars I and III can be measured and the voltage $V_{19-21}$ between the pass bars XIX and XXI can be measured. Voltage $V_{1-3}$ indicates the voltage of the two battery modules 9, 9 that are connected electrically in series between pass bar I and pass bar III, in other words the twelve series-connected single cells 7, and voltages $V_{3-5}$, $V_{5-7}$ ... $V_{19-21}$ shown in FIG. 15 likewise indicate the voltages between two battery modules 9, 9. These leads 37 are led from first end plate 19 as a multicore parallel cable 38 as shown in FIG. 7 for inputting to battery ECU 2 the measured terminal voltages between the two battery modules 9, 9.

If voltage failure is detected by the voltage measurement of this battery module 9 unit, this means that some failure has occurred in at least one of the twelve single cells 7 belonging to the corresponding two battery modules 9, 9, so the detection of failure can be performed with restriction to a comparatively narrow range.

Also, the voltage measurement of the battery module 9 unit can be used in the calculation of the SOC of the battery module 9 unit from the detection values regarding charging/discharging current, to be described, and temperature detection of the battery module 9 unit.

As shown in FIG. 16, the detection of discharge current and charging current of battery pack 8 is performed by a current sensor 87 arranged on the charging/discharging circuit between battery pack 8 and relay 86. This current sensor 87 is accommodated in charging/discharging circuit unit 3 shown in FIG. 1 and power cable 35 from battery pack 8 connected to relay 86 likewise accommodated in charging/discharging circuit unit 3 penetrates within sensor 87, thereby enabling charging and discharging current to be detected. The charging and discharging currents detected by this current sensor 87 are input to battery ECU 2.

Next, regarding detection of battery temperature, the construction is such that detection of a temperature abnormality of the individual single cells 7, temperature detection at battery module 9 unit, and detection of temperature of the air used to cool battery pack 8 by means of blower 5 can be performed.

Temperature abnormality detection for the individual single cells 7, as shown in FIG. 4 and FIG. 5, is performed utilizing abnormal temperature sensors 14 mounted on each single cell 7 when battery module 9 is formed.

As shown in FIG. 7, FIG. 10 and FIG. 12, on first end plate 19, there are fixed in the resin plate by insert molding holding tabs 43. These are connected to terminal tabs 16, which lead connecting wires 15 from the two ends of battery module 9 whereby six of these abnormal temperature sensors 14 are connected in series. Screw holes 45 are provided in exposed portions in the through-holes 44 formed in first end plate 19, terminal tabs 16 being inserted in through-holes 44 and bent, so that, as shown in FIG. 12, terminal tabs 16 are electrically and mechanically connected to holding tabs 43 using screws 46. Holding tabs 43 have two screw holes 45, 45 at both ends thereof, so that the terminal tabs 16 of adjacent battery modules 9 are connected thereto. However, the holding tab 43 indicated by P in FIG. 10 has only a single screw hole 45 that acts as a terminal on one side only.

As shown in FIG. 13, in the case of the second end plate 20 also, identical holding tabs 43 are fixed in the resin plate by insert molding. The holding tabs 43 of this second end plate 20 are provided with two screw holes at both ends, so as to connect terminal tabs 16 of adjacent battery modules 9. However, the holding tab 43 indicated by Q in FIG. 13 has only a single screw hole 45, and performs the role of the terminal at the other end.

Figure 17:
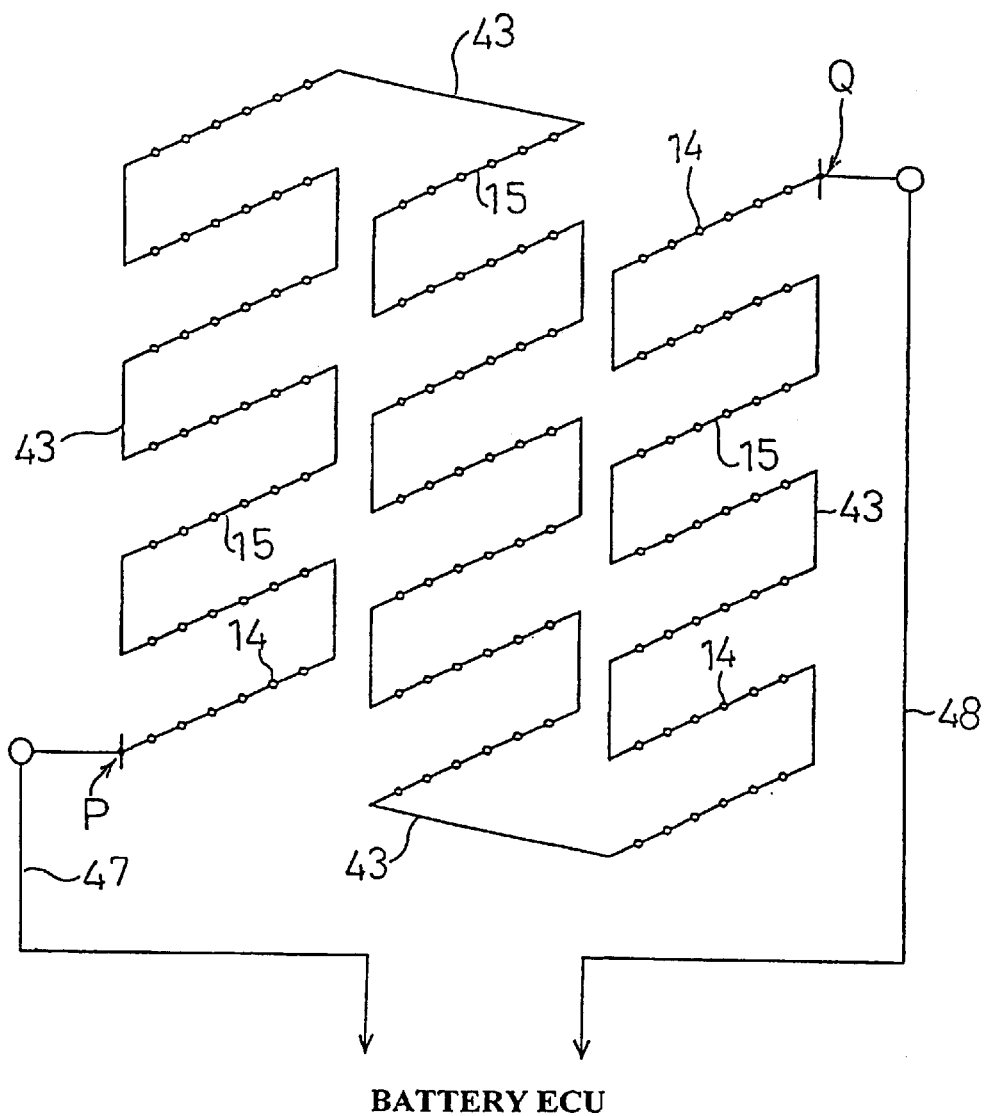
FIG. 17 is a connection diagram showing the connected condition of an abnormal temperature detection sensor.

By using holding tabs 43 to connect adjacent terminal tabs 16 mounted on each battery module 9, the condition shown in FIG. 17 is produced, in which abnormal temperature sensors 14 mounted on all one hundred and twenty single cells 7 arranged in battery holder 6 are connected in series. As shown in FIG. 3, leads 47, 48 to the outside are connected to holding tab 43 indicated by P and holding tab 43 indicated by Q, to deliver input to battery ECU 2.

This detection arrangement for temperature abnormality of the individual single cells 7 is adopted respectively for the two battery holders 6, 6 and connection is effected to battery ECU 2. If even one of the one hundred and twenty single cells 7 in respective battery holders 6 shows an abnormal rise in temperature, the resistance of abnormal temperature sensor 14 mounted on this single cell 7 abruptly increases, so a resistance value different from the normal is detected by battery ECU 2, enabling failure of the single cell 7 to be detected.

By means of this arrangement, failure of the two hundred and forty single cells 7 accommodated in battery pack 8 can be detected by a simple construction in which two leads 47, 48 are led to the outside from each respective battery holder 6.

Figure 19:
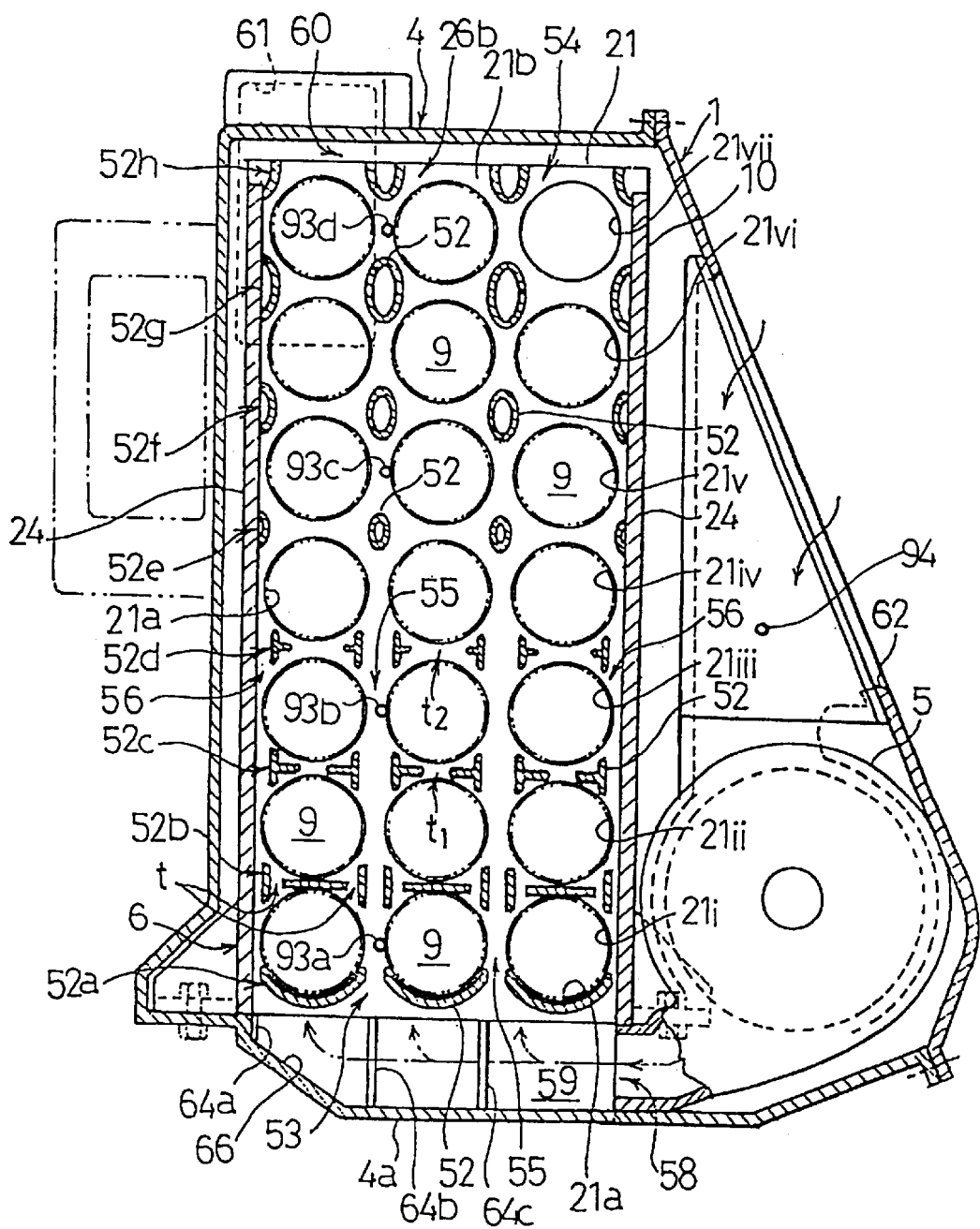
FIG. 19 is a cross-sectional view showing a cooling construction.

Next, for temperature detection in battery module 9 units, as shown in FIG. 19, for each battery holder 6, 6, respective block temperature sensors 93a, 93b, 93c, 93d are mounted on battery modules 9 in the middle of the first level, third level, fifth level and seventh level from the upstream side of the flow of cooling air, these modules being arranged parallel to each other transversely in three rows and vertically in seven rows for each battery holder 6, 6; thus the temperature of the battery modules 9 is detected. As regards the temperature of the battery modules 9 at the second level, forth level and sixth level, where no block temperature sensors 93a to 93d are mounted, the temperature of these battery modules 9 can be determined by calculation or by inference of the an intermediate value of these from the detection temperatures obtained by block temperature sensors 93a to 93d respectively mounted thereabove and therebelow. Also, the temperatures of the battery modules 9 positioned to left and right at each level can be inferred as approximate temperatures from the temperature of the middle battery module 9. Consequently, temperature detection can be performed without giving rise to cost or waste of wiring processing and detected temperature processing etc. involved in mounting temperature sensors on all of the twenty battery modules 9 accommodated in a battery holder 6 or, further, all of the forty battery modules 9 in battery pack 8.

Regarding the means for temperature detection whereby the temperature of battery modules 9 is inferred using temperature sensors 93a to 93b provided at specified positions, temperature sensors are mounted on battery modules 9 positioned on the upstream side and downstream side of the cooling air flow, in the condition shown in FIG. 19, on the first level and seventh level battery modules 9, thereby making it possible to calculate the temperature distribution from the respective temperature detection values, and to determine the temperature of battery modules 9 of the second level to sixth level arranged therebetween.

In this way, temperature detection of battery module 9 units can be achieved even by temperature measurement at two locations per battery holder 6.

Also, since the temperature in the battery holder 6 varies depending on a flow rate and temperature of cooling air and a mean power of charging and discharging, by finding the mode of change of temperature of battery module 9 in response to these temperature variation conditions beforehand, it can be arranged that, by detecting the temperature of a single battery module, the temperature of the other battery modules arranged parallel thereto can be inferred by referring to the aforementioned temperature variation conditions; thus, temperature can be detected without providing temperature sensors at all the battery modules, making it possible to detect the temperature of the battery module 9 unit while yet providing means for temperature detection in only a small number of locations.

Furthermore, as shown in FIG. 19, by mounting an air temperature sensor 94 in the air intake port 62 of blower 5, the temperature of the cooling air can be detected.

The SOC of each battery block is calculated from the above detected data of voltage, current and temperature. The block voltages $V_{1-3}$ to $V_{19-21}$ (see FIG. 15) detected at each of the two battery modules 9, and the temperature of each battery block calculated from the detected values of the block temperature sensors 93a to 93d, together with the current detected by current sensor 87 are input respectively to battery ECU 2, so that the SOC for each block can be calculated from the voltage and current conditions taking temperature as a parameter.

(B) Countermeasures system on occurrence of failure

Figure 18:
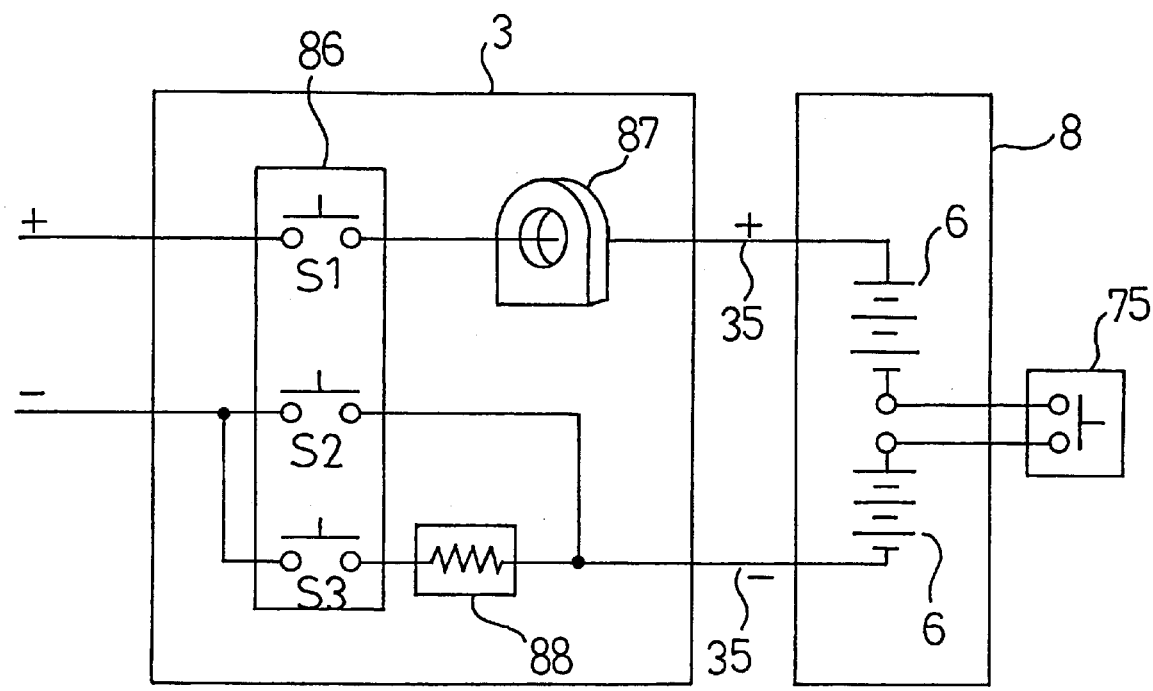
FIG. 18 is a circuit diagram showing the layout of a charging/discharging circuit unit.

Referring to FIG. 18 a relay 86 that interrupts the charging/discharging circuit of battery pack 8 in the event of failure is provided in order to deal with any occurrence of failure in battery power source device 1. Also, in order to avoid occurrence of failure during manufacture or during maintenance and inspection, a series circuit interruption plug (means for series circuit interruption) 75 is provided that interrupts the high voltage circuit in the hot-line condition.

As shown in FIG. 18, relay 86 has respective plus and minus power cables 35, 35 from battery pack 8 connected thereto and interrupts the charging/discharging circuit on actuation in response to control from vehicle control ECU 84 arranged on the vehicle side on occurrence of failure.

For circuit opening/closing of this relay 86, as shown in FIG. 18, there are provided three circuit contacts S1 to S3; when the circuit is interrupted, all of contacts S1, S2, S3 are open; when the circuit is connected, contact S3, to which is connected a resistor (means for preventing rush current) 88 for preventing rush current and plus-side contact S1 are closed, thereby preventing excessive rush current when battery pack 8 is connected to the vehicle devices. After contacts S1, S3 are connected, after a prescribed delay time, contact S2 is closed and contact 33 is opened, thereby effecting circuit connection. Relay 86 and resistor 88 are accommodated in charging/discharging circuit unit 3 shown in FIG. 1.

Series circuit interruption plug 75 enables the hot-line condition of the high-voltage circuit to be removed by interrupting the series connection circuit of the batteries during manufacture of battery power source device 1 or when performing maintenance and inspection with the outer case 4 open. During manufacture, part of the series circuit is interrupted by performing a manual operation to remove series circuit interruption plug 75; after completion, series connection of the batteries of battery pack 8 is achieved by inserting series circuit interruption plug 75. Also, when outer case 4 is opened during maintenance and inspection etc., the hot line condition of the high voltage circuit is removed by interrupting part of the series circuit of the batteries by means of series circuit interruption plug 75 provided on the outside of outer case 4. The series circuit that is interrupted by this series circuit interruption plug 75 may be between battery holders 6, 6 as shown in FIG. 18 or between the connections of battery modules 9 as shown by the phantom lines in FIG. 15. In the case where interruption is effected between battery holders 6, 6, the connection cable 36 between battery holders 6, 6 shown in FIG. 3 is removed and the plus output terminal of one battery holder 6 and the minus output terminal of the other battery holder 6 are connected to series circuit interruption plug 75. Also, when interruption is effected between the connection of battery modules 9, for example pass bar 28 i.e. XVII shown in FIG. 15 is exposed at an aperture provided in first end plate 19 and, in subsequent processing, the location indicated by N is severed and the locations indicated by XVIIa and XVIIb and series circuit interruption plug 75 are connected by leads 76, 77.

(C) System for countering generation of heat by the batteries

Since the electrical characteristics of the batteries change with temperature, they must be maintained at a correct temperature. For this reason, means for battery cooling in order to prevent rise in temperature due to charging/discharging are indispensable, and as shown in FIG. 1, a blower 5 is provided, a bottom aperture of holder case 10 provides an air inlet 53 while an upper aperture provides an air outlet 54, and cooling of the battery modules 9 is effected by cooling air flowing from bottom (upstream side) to top (downstream side).

As shown in FIG. 3, FIG. 7, FIG. 8 and FIG. 9, in holder case 10, twenty battery modules 9 have both ends thereof fixed in the first end plate 19 and the second end plate 20. Also, battery modules 9 are supported in insertion holes 25a of partitions 25, 25 by means of anti-vibration rings 51, 51 at two locations respectively about ⅓ of their length from both ends in the longitudinal direction. These anti-vibration rings 51 are integrally molded in the anti-vibration rubber sheet 22 such that they project from its surface and are mounted along one face of partition 25 by pressing in all of the anti-vibration rings 51 into insertion holes 25a of partition 25. Holder case 10 is partitioned by these two partitions 25, 25 into three spaces namely, in order from the second end plate 20 to the first end plate 19, first divided space 26a, second divided space 26b, and third divided space 26c; cooling fin plates 21 are inserted from above into the middles of these respective spaces 26a, 26b, 26c and fixed to case body 18. FIG. 8 and FIG. 19 show the relationship between cooling adjustment fins 52 formed on cooling fin plate 21 (including first-level fin 52a, second-level fin 52b, third-level fin 52c, fourth-level fin 52d, fifth-level fin 52e, sixth-level fin 52f, seventh-level fin 52g and eighth-level fin 52h) and the battery modules 9 that are freely inserted into insertion holes 21a of cooling fin plate 21.

The air-cooling construction of battery modules 9 will now be described, taking as an example second divided space 26b that is defined in the middle. As shown in FIG. 7 and FIG. 8, the cooling adjustment fins that project in both directions from the plate body 21b of cooling fin plate 21 are constructed so as to enable the flow direction and flow rate of the air current to be adjusted. As shown in FIG. 19, the ratio in which air directly strikes first-level battery module 9 is restricted by the provision of first fin 52a, which is of arcuate cross-section, and which surrounds on their respective undersides the three insertion holes 21a (21i) of the lowermost level (first level) (the insertion holes 21a from the first level to the seventh level are indicated in FIG. 19 by 21i to 21vii). In the upper and lower intermediate positions between the insertion holes respectively corresponding to: the three insertion holes 21i of the first level and the three insertion holes 21ii of the second level thereabove; the three insertion holes 21ii of the second level and the three insertion holes 21iii of the third level thereabove; and the three insertion holes 21iii of the third level and the three insertion holes 21iv of the fourth level thereabove, there are provided second-level fins 52b, third-level fins 52c, and fourth-level fins 52d; these are shaped as a flat H in cross-sectional shape with regions of discontinuity. In the case of second-level fins 52b, discontinuities t, t are formed on both sides of the H-shaped cross-sectional part; in the case of third-level fins 52c, a discontinuity $t_1$ is formed in the middle of the H-cross-section part, and, in the case of fourth-level fins 52d, a wide discontinuity $t_2$ is formed in the middle of the H-cross-section part. Thus, the ratio in which the air directly strikes second-level battery modules 9 is greater than that in which it strikes first-level battery modules 9; the ratio in which air directly strikes third-level battery modules 9 is greater than that in which it strikes second-level battery modules 9; and the ratio in which air directly strikes fourth-level battery modules 9 is greater than that in which it strikes third-level battery modules 9.

Between the three insertion holes 21iv of the fourth level and the three insertion holes 21v of the fifth level thereabove, there are provided fifth-level fins 52e; these consist of four fins transversely arranged, namely, two fins of vertically elongate elliptical cross-section (those shown in FIG. 19, in order to reduce weight, are of hollow cross-section, but fins without a hollow portion could equally be used), and two fins of vertically elongate semi-elliptical cross-section (these could be either hollow or not hollow).

The two vertically elongate elliptical cross-section fins positioned in the middle are arranged at the midpoints of the four insertion holes (21iv, 21v) respectively in their vicinity to left and right and above and below, while the vertically elongate semi-elliptical cross-section fins positioned at both ends are positioned on the outside vertically midway between the upper and lower insertion holes (21iv, 21v) corresponding thereto, and are in contact with the lateral sides of plate body 21b of cooling fin plate 21. Between the three insertion holes 21v of the fifth level and the three insertion holes 21vi of the sixth level thereabove, and also between the three insertion holes 21vi of the sixth level and the three insertion holes 21vii of the seventh level thereabove, there are arranged sixth-level fins 52f and seventh-level fins 52g comprising four fins in the same positions and practically the same shapes as fifth-level fins 52e. Furthermore, eighth-level fins 52h are provided consisting of four fins which are in the same positional relationships as seventh-level fins 52g but which consist of fins of the same shape as the seventh-level fins 52g but with the upper halves removed, in positions above the three insertion holes 21vii of the uppermost level (seventh level). Regarding the cross-sectional areas of these, the cross-sectional areas of sixth-level fins 52f are larger than the cross-sectional areas of the fifth-level fins 52e, while the cross-sectional areas of the seventh-level fins 52g are larger than the cross-sectional areas of the sixth-level fins 52f. By this making the cross-sectional areas of the cooling adjustment fins 52e, 52f, 52g larger in the upwards direction, the flow passages for the air current formed between battery modules 9 and cooling adjustment fins 52 are made progressively narrower in the upwards direction. Thus, the flow rate of the air flowing around the periphery of fifth-level battery modules 9 is larger than the flow rate of the air flowing around the periphery of fourth-level battery modules 9; the flow rate of the air flowing around the periphery of sixth-level battery modules 9 is larger than the flow rate of the air flowing around the periphery of fifth-level battery modules 9; and the flow rate of the air flowing around the periphery of the seventh-level battery modules 9 is made larger than the flow rate of the air flowing around the periphery of the sixth-level battery modules 9. This utilizes the fact that, if the flow rate of the air current is increased, its cooling effect is increased in proportion to the square root thereof.

In the above, the air-cooling construction of battery modules 9 was described taking as example second divided space 26b, but the air-cooling construction in the other, first divided space 26a and third divided space 26c is identical. In each of these, of the large number of battery modules 9 arranged in many levels in parallel in the direction orthogonal to the air current flowing from below to above, those battery modules 9 belonging to the lower group (in the case shown in FIG. 19, those arranged at level 1 to level 4) have the undersides of battery modules 9 covered by screening-type fins 52a to 52d that adjust the quantity of air that directly strikes the battery modules 9, and the quantity of air that directly strikes battery modules 9 is progressively increased from the lowermost level (first level) towards the upper levels. In this way, over-cooling of the battery modules 9 of the lowermost level is prevented and the amount of air directly striking the battery modules 9 is increased so as to compensate for the drop of cooling effect of the air which gradually rises in temperature due to the heat generated by the batteries as it proceeds to the upper levels; in this way, practically uniform cooling of the battery modules 9 at each level (first level to fourth level) can be achieved.

Of the air that cools the battery modules 9 belonging to the lower group, as shown in FIG. 19, most ascends through the passages 55, 55 formed between the left and right battery modules 9 and through the passages 56, 56 formed between battery modules 9 and side wall 24; some of the air is taken into battery modules 9 and then again merges with passages 55, 56, after which the air reaches below battery modules 9 of the fifth level. Next, the air current is used for cooling battery modules 9 belonging to the upper group (in the case shown FIG. 19, those arranged at the fifth to the seventh levels). However, since the air has already cooled the battery modules 9 of the four levels belonging to the lower group, its temperature is higher, so its cooling effect has lessened. In order to make up for this, the air current for cooling of battery modules 9 belonging to the upper group is throttled, thereby raising the flow rate of the air current around battery modules 9 Cooling of battery modules 9 at each level (fifth level to seventh level) is made to be performed practically uniformly by raising the flow rate of the air current around battery modules 9 so as to compensate for the drop of cooling effect of the air caused by its gradual rise in temperature as it ascends; this is achieved by successively narrowing the gaps with respect to the battery modules 19 by having fins positioned diagonally below the battery modules 9 of the fifth, sixth and seventh levels and diagonally above the battery modules 9 of the seventh level, above passages 55, 55, 56 and 56.

In this way, practically uniform cooling is achieved of all of the battery modules 9 from the lowermost level to the uppermost level. However, the adjustment of the air current in order to achieve uniform cooling could also be performed for example by adopting fins of the screening type for the battery modules 9 of the lower three levels, not using fins for the battery modules 9 of the intermediate fourth level, and adopting flow path throttling type fins for the battery modules 9 of the upper three levels, thereby adjusting the air current.

Figure 20:
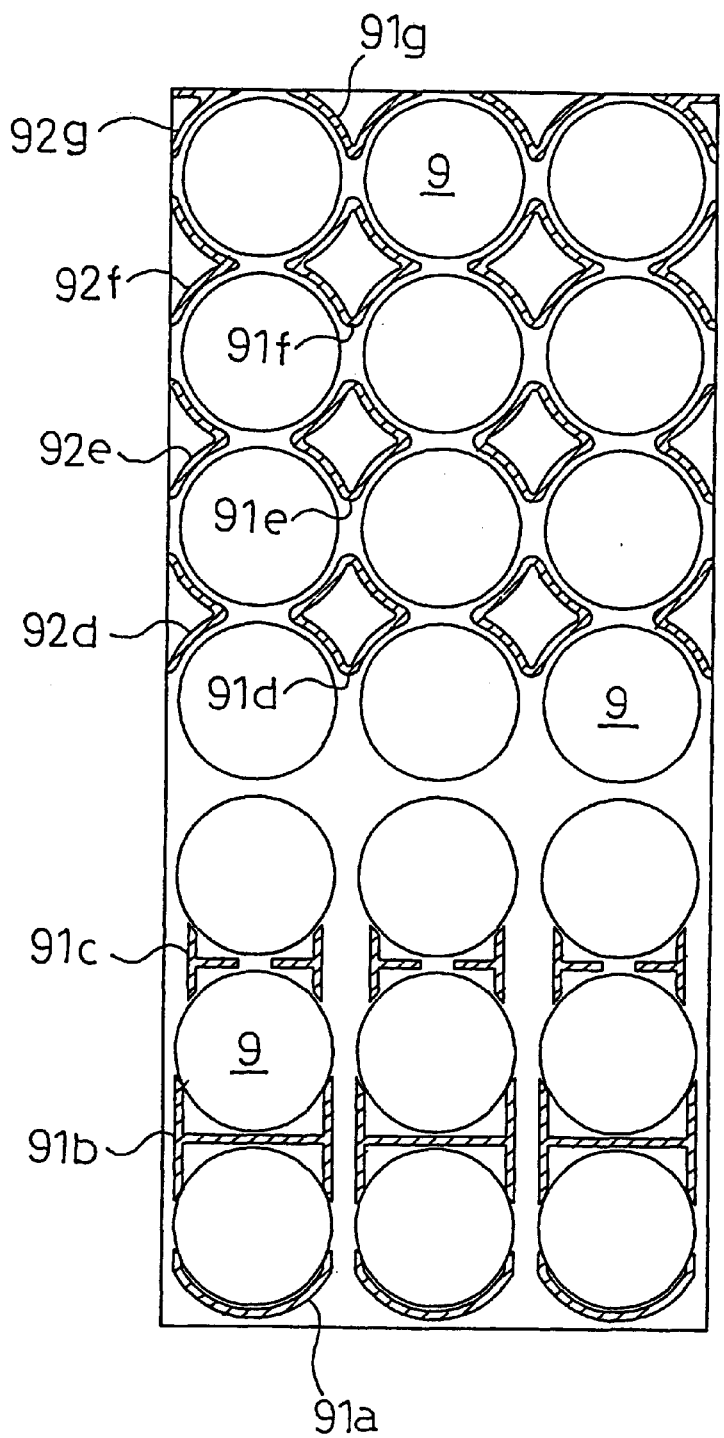
FIG. 20 is a cross-sectional view showing a further embodiment of a cooling adjustment fin.

FIG. 20 shows a cooling adjustment fin construction designed in accordance with the above outline. As shown in the drawing, screening-type fins 91a, 91b, 91c are provided for battery modules 9 in the bottom three levels; no fins are provided for the battery modules 9 of the intermediate, fourth level; and flow path throttling type fins 91d, 91e, 91f and outer lateral fins 92d, 92e, 92f are provided for the battery modules 9 of the upper three levels.

With this construction, the degree of screening applied in regard to the cooling air increases in the upstream direction of the cooling air flow, while the flow rate of the air current is increased progressively on the downstream side by making the separation between the battery modules 9 and fins progressively smaller in the downstream direction; more effective uniform cooling can thereby be achieved.

The construction for introduction and discharge of cooling air whereby the cooling air is made to flow effectively in respect of battery pack 8 constructed as described above and accommodated in outer case 4 will now be described.

As shown in FIG. 8, FIG. 19 and FIG. 21, blower 5 and motor 57 are arranged laterally below holder case 10. The blowing port 58 thereof is arranged below holder case 10. Air that is blown under pressure from blower 5 passes through air supply chamber 59 formed at the bottom of outer case 4 and reaches air inlet 55 at the bottom end of holder case 10, then flows from bottom to top within holder case 10, cooling battery modules 9. It then issues from air outlet 54 of holder case 10 and passes through air discharge chamber 60 formed above outer case 4, and is discharged to the outside of outer case 4 from discharge ports 61 formed at the top lateral end of outer case 4.

FIG. 21 shows the construction whereby cooling air is fed under pressure to the left and right battery holders 6, 6 by a single blower 5. Blower 5 is provided with a pair of left and right sirocco fans and blowing ports 58, 58; air within the vehicle chamber is drawn in from air intake port 62 and air is uniformly delivered from the pair of blowing ports 58, 58 to left and right air supply chambers 59, 59. Each of these air supply chambers 59 is constituted by a space defined by bottom plate 4a of outer case 4, front wall 4b of bottom plate 4a erected in a frontal position in FIG. 21, and an undersurface of holder case 10. A plurality of curved flow guides 64a, 64b, 64c that direct the air inwards and sideways from blowing port 58 are erected on bottom plate 4a at the inlet 63 facing blowing port 58. Inlet 63 is arranged in the center in the width direction of outer case 4, being disposed so as to be positioned below first divided space 26a of holder case 10. Bottom plate 4a is formed so as to have a slope 66 such that its position becomes gradually higher towards the outside within air supply chamber 59 i.e. towards second divided space 26b and third divided space 26c. An air current guide 67 of small height is provided (see FIG. 8) to direct the air upwards at the position below the boundary of second divided space 26b and third divided space 26c of another slope 65.

The air that is drawn in from inlet 63 passes through two air passages formed between the three air current guides 64a, 64b, 64c and is directed towards the inside and towards second and third divided spaces 26b, 26c, part thereof being led into first divided space 26a. In order to prevent the air current from then passing straight through these air passages with the result that the amount of air fed into first divided space 26a would be insufficient, there is provided an air current guide 68 to direct air upwards in the vicinity of the air passage inlet nearest second end plate 20. Of the air issuing from the two air passages, part is fed into second divided space 26b, while the rest is fed below third divided space 26c. The air current guide 67 is provided so as to prevent the amount of air fed into second divided space 26b from then being insufficient. The air that is fed to below third divided space 26c is then fed into third divided space 26c.

As described above, due to the provision of air current flow guides 64a, 64b, 64c, air current guides 67, 68, and slopes 65 and 66, the amount of air drawn into each of the divided spaces 6a, 26b, 26c is made practically uniform and non-uniformity of the amount of air that is drawn in at the front and inside in divided spaces 26a, 26b, 26c is prevented. It should be noted that the two single cells 7 that are positioned within second divided space 26b are in the middle position of battery module 9, and so are particularly likely to be affected by heat generated by the single cells 7 arranged in the first and third divided spaces 26a, 26c; they therefore need more cooling by the air current than these single cells. Air current guide 67 is therefore preferably designed such that somewhat more air is fed into the second divided space 26b than is fed into the other divided spaces 26a, 26c.

As shown in FIG. 8 and FIG. 21, outer case 4 is provided with a holder case mounting seat 71 on bottom plate 4a. Left and right holder cases 10, 10 are mounted and fixed by bolt and nut 73 at its legs 72. Also, a flange 74 mounted on the vehicle body is provided at the periphery of outer case 4.

(D) System for outputting battery operating condition data

In addition to supplying battery power to the by a hybrid vehicle, battery power source device 1 receives a supply of charging power from a generator provided in the vehicle. Battery pack 8 can be maintained in the appropriate operating condition by correctly performing this charging/discharging. Accordingly, in battery ECU 2, data such as the SOC, indicating the voltage, current, temperature and battery operating condition detected by the various sensors are output to the vehicle control ECU (vehicle control means) 84 on the vehicle side; discharge and charging power on the vehicle side are thereby regulated, so that the correct operating condition is maintained in which neither over-discharging or overcharging takes place.

As shown in FIG. 16, vehicle control ECU 84 controls the use of battery power in order to obtain drive torque for vehicle running with respect to the engine 90, motor 95, and generator 96, in accordance with the data input from an accelerator sensor that detects the degree of accelerator opening and battery ECU 2 etc., and exercises control such that an appropriate battery charging power is obtained from generator 96.

The data that is output from battery ECU 2 to this vehicle control ECU 84 comprises control data for discharge and charging power, charging/discharging demand data for SOC adjustment, battery condition data such as SOC, voltage and temperature, and failure detection data of battery power source device 1, etc.; these are output in the form of a digital signal after conversion to numerical values.

In the calculation of the SOC, as described above, the SOC can be found for each battery block by referring to a data table in which is predetermined the condition of change in response to battery temperature of the block voltage (V) detected for the two battery module 9 units and the current (I) detected by current sensor 87. The SOC is the electrical property whereby the I-V characteristic curve changes depending on the amount of electricity that is stored and is characteristic of the type of battery; the nickel metal-hydride batteries that are used in this embodiment also have characteristic electrical properties. Accordingly, the characteristic graph whereby the I-V characteristic curve changes depending on the SOC condition and temperature is found beforehand and the voltage values and current values detected at prescribed time intervals (for example 100 ms) at the detected battery temperature are plotted on the co-ordinates of the I-V characteristic graph of the corresponding temperature; an approximate I-V characteristic curve can be detected as the SOC condition after comparing the distribution curve of this plot group and the previously found I-V characteristic curve.

Taking SOC=100% as the fully charged condition, if, from a condition exceeding SOC 80 to 90%, further charging power is supplied i.e. overcharging is performed, there is a risk of damage to the battery due to rise in battery temperature. On the other hand, over-discharging, in which discharging is performed from a condition below SOC=10 to 20% also risks causing damage. In performing operation control of the battery, it is therefore necessary to maintain the SOC in an appropriate range such that it does not get into the overcharged or under-charged condition. The battery ECU 2 therefore calculates the SOC and outputs this to the vehicle control ECU 84 and, in accordance with the SOC and the detected data of voltage, current and temperature, outputs charging/discharging power control data, which is used to apply restriction to the use of battery power source device 1 of the vehicle. For example, in the case of a hybrid vehicle in which engine 90 and motor 95 are jointly used as drive sources for vehicle running, when in the condition where the SOC is close to fully charged, increase of discharge power by running drive performed by motor 95 is prompted, but in a condition which is getting close to over-discharged, increase of charging power by running drive performed by engine 90 is prompted. Also, charging or discharging are executed under the control of the vehicle control ECU 84 such that the SOC becomes a prescribed value by control of engine 90 and motor 95, by outputting charging/discharging demand data depending on the detected SOC condition such that this becomes a prescribed value in the correct SOC range.

Also, when the battery ECU 2 detects a failure from the SOC and detected values of voltage, current and temperature, this is output from battery ECU 2 to vehicle control ECU 84, so vehicle control ECU 84 undertakes measures to cope with the failure. For example, if abnormal rise in temperature of the battery is detected or if an over-discharged condition is detected by SOC determination, vehicle control ECU 84 actuates relay 86, interrupting the charging/discharging circuit, so enabling battery protection and prevention of occurrence of damage to be performed.

Thus, due to the provision of battery ECU 2 on the side of battery power source device 1, the operating condition of battery pack 8 is subject to dual monitoring by battery ECU 2 and that provided in the vehicle, so control is exercised such as to obtain an appropriate operating condition.

As described above, with the present invention, the temperature, voltage and current are detected at a plurality of locations of the battery pack and the operating condition of the batteries is ascertained by means of the SOC calculated from the detected values. By reporting this operating condition to the device that uses the battery power source device, the battery power source device is controlled to an appropriate charging/discharging power. Also, since a failure of the battery pack can be detected from the detected values, measures to deal with the failure can be rapidly implemented. Consequently, when this battery power source device is used as a power source, it is capable of always supplying stable battery power and can rapidly cope with failures, so the present invention is useful in aiming for stable operation of devices using a battery power source device.

What is claimed is:

1. A battery power source device comprising:
   a battery pack having battery modules formed by connecting in series electrically and mechanically a plurality of single cells in the form of secondary cells, said battery modules being elongated in a longitudinal direction;
   said battery modules being held in a holder case in a three-dimensionally parallel arrangement and being electrically connected in series;
   cooling means for forcing coolant to flow in a direction orthogonal to the longitudinal direction of said battery modules;
   temperature detection means for detecting temperature of a first one of said battery modules at an upstream position of the coolant flow and temperature of a second one of said battery modules at a downstream position of the coolant flow; and
   means for calculating temperature of ones of said battery modules in a middle flow region between the upstream position and the downstream position based on the detected temperature of said first one and said second one of said battery modules and in accordance with a predetermined temperature distribution characteristic of said battery pack.

2. The battery power source according to claim 1 wherein the temperature distribution characteristic of said battery pack is determined based on flow rate and temperature of said coolant and a mean of at least one of a charging power and a discharging power.

3. The battery power source device according to claim 1 wherein the temperature detection means includes a temperature sensor disposed at each of said first one and said second one of said battery modules.

4. The battery power source device according to claim 1 further comprising means for controlling operation of the cooling means in accordance with the temperatures detected by the temperature detection means.

5. A battery power source device comprising:
a battery pack having battery modules formed by connecting in series electrically and mechanically a plurality of single cells in the form of secondary cells, said battery modules being elongated in a longitudinal direction;
said battery modules being held in a holder case in a three-dimensionally parallel arrangement and being electrically connected in series;
cooling means for forcing coolant to flow in a direction orthogonal to the longitudinal direction of said battery modules;
temperature detection means for detecting a temperature of one of said battery modules arranged in parallel to a direction orthogonal to the direction of the coolant flow; and
means for calculating a temperature of another one of said battery modules arranged parallel to said one of said battery modules based on the temperature detected of said one of said battery modules by using a predetermined temperature distribution characteristic of said battery pack.

6. A battery power source device comprising:
a battery pack having battery modules formed by connecting in series electrically and mechanically a plurality of single cells in the form of secondary cells, said battery modules being elongated in a longitudinal direction;
said battery modules being held in a holder case in a three-dimensionally parallel arrangement and being electrically connected in series;
cooling means for forcing coolant to flow in a direction orthogonal to the longitudinal direction of said battery modules;
temperature detection means for detecting a temperature of one of said battery modules; and
means for calculating a temperature of another one of said battery modules based on the temperature detected of said one of said battery modules and a predetermined temperature distribution characteristic of said battery pack.

7. The battery power source device according to claim 6 wherein the temperature distribution characteristic of the battery pack is determined based on flow rate and temperature of the coolant and of at least one of a charging mean power and a discharging mean power.

8. The battery power source device according to claim 6 wherein said temperature detection means includes a temperature sensor disposed at said one of said battery modules.

9. The battery power source device according to claim 6 further comprising means for controlling operation of the cooling means in accordance with the temperatures detected by the temperature detection means.

10. A battery power source device comprising:
a battery pack having battery modules that are interconnected and elongated in a longitudinal direction;
a holding casing containing said battery modules;
cooling means for forcing coolant to flow in a direction orthogonal to the longitudinal direction of said battery modules;
temperature detection means for detecting temperature of a first one of said battery modules at an upstream position of the coolant flow and temperature of a second one of said battery modules at a downstream position of the coolant flow; and
means for calculating temperature of ones of said battery modules at positions other than the upstream position and the downstream position based on the detected temperature of said first one and said second one of said battery modules and in accordance with a predetermined temperature distribution characteristic of said battery pack.

11. The battery power source according to claim 10 wherein the temperature distribution characteristic of said battery pack is determined based on flow rate and temperature of said coolant and a mean of at least one of a charging power and a discharging power.

12. The battery power source device according to claim 10 wherein the temperature detection means includes a temperature sensor disposed at each of said first one and said second one of said battery modules.

13. The battery power source device according to claim 10 further comprising means for controlling operation of the cooling means in accordance with the temperatures detected by the temperature detection means.

14. A battery power source device comprising:
a battery pack having battery modules that are interconnected and elongated in a longitudinal direction;
a holding casing containing said battery modules;
cooling means for forcing coolant to flow in a direction orthogonal to the longitudinal direction of said battery modules;
temperature detection means for detecting a temperature of one of said battery modules; and
means for calculating a temperature of another one of said battery modules based on the temperature detected of said one of said battery modules by using a predetermined temperature distribution characteristic of said battery pack.

15. The battery power source device according to claim 14 wherein the temperature distribution characteristic of the battery pack is determined based on flow rate and temperature of the coolant and of at least one of a charging mean power and a discharging mean power.

16. The battery power source device according to claim 14 wherein said temperature detection means includes a temperature sensor disposed at said one of said battery modules.

17. The battery power source device according to claim 14 further comprising means for controlling operation of the cooling means in accordance with the temperatures detected by the temperature detection means.

* * * * *